United States Patent
Watanabe et al.

(10) Patent No.: US 6,791,777 B2
(45) Date of Patent: Sep. 14, 2004

(54) DATA SYNCHRONIZING SIGNAL DETECTOR, SIGNAL PROCESSING DEVICE USING THE DETECTOR, INFORMATION RECORDING AND REPRODUCING APPARATUS HAVING THE DETECTOR AND THE DEVICE, DATA SYNCHRONIZING SIGNAL DETECTING METHOD, AND INFORMATION RECORDING MEDIUM FOR USING IN THE METHOD

(75) Inventors: Yoshiju Watanabe, Ninomiya (JP); Terumi Takashi, Chigasaki (JP)

(73) Assignee: Hitachi Global Storage Technologies Japan, Ltd. (JP)

(*) Notice: Subject to any disclaimer, the term of this patent is extended or adjusted under 35 U.S.C. 154(b) by 195 days.

(21) Appl. No.: 09/784,555

(22) Filed: Feb. 16, 2001

(65) Prior Publication Data

US 2001/0043417 A1 Nov. 22, 2001

(30) Foreign Application Priority Data

May 19, 2000 (JP) .................................... 2000-148835

(51) Int. Cl.$^7$ ................................................ G11B 5/09
(52) U.S. Cl. ........................................ 360/51; 360/65
(58) Field of Search ............................ 360/51, 65, 46, 360/135, 32, 61; 375/229, 230, 232

(56) References Cited

U.S. PATENT DOCUMENTS 5,774,286 A * 6/1998 Shimoda ...................... 360/46

FOREIGN PATENT DOCUMENTS

| JP | 08/096312 | 4/1996 |
| JP | 09-093127 | 4/1997 |
| JP | 09-223365 | 8/1997 |
| JP | 10-125002 | 5/1998 |
| JP | 10-162515 | 6/1998 |
| JP | 11-096681 | 4/1999 |
| JP | 11-251927 | 9/1999 |
| JP | 11-339403 | 12/1999 |
| JP | 2000-100084 | 4/2000 |

OTHER PUBLICATIONS

IEEE Spectrum, Nov. 1996, pp. 70–76, by Fisher et al, "PRML detection boosts hard–disk drive capacity".*

"Distance Enhancing Codes for EPRML: Performance Comparison using Spinstand Data", by Steven G. McCarty et al. IEEE. Trans. Magn. vol. 33, No. 5, Sep. 1997.

* cited by examiner

Primary Examiner—Alan T. Faber
(74) Attorney, Agent, or Firm—Sofer & Haroun, LLP

(57) ABSTRACT

A data discriminating unit includes a data discriminator and a sync signal discriminator. A data sync signal is detected for the bit string discriminated from the output of the sync signal discriminator, and the data is demodulated for the bit string discriminated from the output of the data discriminator, thereby optimizing the signal to a form suitable for discrimination and detection of the data sync signal and demodulation for data reproduction. As a result, the detection performance of the data sync signal can be improved while maintaining the data discrimination performance. A Viterbi decoder is used for discrimination by the data discriminator and the sync signal discriminator for the optimization thereby to optimize the number of states, the number of paths for state transition and the path memory length. A signal having no continuous inversions of the recording data is used as the data sync signal.

8 Claims, 19 Drawing Sheets

DATA SYNCHRONIZING SIGNAL DETECTOR, SIGNAL PROCESSING DEVICE USING THE DETECTOR, INFORMATION RECORDING AND REPRODUCING APPARATUS HAVING THE DETECTOR AND THE DEVICE, DATA SYNCHRONIZING SIGNAL DETECTING METHOD, AND INFORMATION RECORDING MEDIUM FOR USING IN THE METHOD

BACKGROUND OF THE INVENTION

1. Field of the Invention

The present invention relates to an information recording and reproducing apparatus, or in particular to a technique for improving the detection rate of a data synchronizing (hereinafter referred to as "sync") signal by improving the performance of data discrimination of a data sync signal section.

2. Description of the Related Art

FIG. 27 shows an example of the recording format in a magnetic disk device. Data are recorded or reproduced in and from each sector of a recording medium constituting a unit storage area. Each sector includes a PLO (phase locked oscillator) sync area 76 for pull-in of a PLL (phase locked loop), a data sync signal 77 for producing a decode timing signal for decoding a modulated code by detecting the start position of the data, a data section 78 for actually recording and reproducing the data, and a CRC (cyclic redundancy check) or an ECC (error correcting code) 79 for detecting or correcting errors. A gap 80 constituting a pattern for absorbing various delay time is arranged between the sectors.

It is well known that accurate detection of the data sync signal 77 is very important for decoding the following data section 78. Even in the case where the data decoded in the data section 78 has a very good error rate, a detection error (i.e. failure to detect at the right position or detection at a wrong position) of the data sync signal 77 which is normally about several bytes will lead to the failure to correctly decode the subsequent data section 78 which lasts several tens of bytes to several hundred bytes, thereby extremely deteriorating the whole error rate.

A device for detecting a data sync signal is disclosed, for example, in JP-A-2000-100084. This device is intended to produce a high ability to detect the data sync signal by correcting a discrimination error, if any, of the data sync signal. With this device, as shown in FIG. 28, input data 411 are discriminated by a data discriminator 401, and an output signal 412 thereof is input to a postcoder 402 for the data and a postcoder 403 for the data sync. The data postcoder 402 subjects the output signal 412 of the data discriminator 401 to the postcoding process (bit operation) and produces an output signal 415. This postcoding process generally corresponds to the preceding process for recording in order to assure correspondence between the data coding for recording and the decoding for reproduction.

The data sync postcoder 403, on the other hand, subjects the output signal 412 of the data discriminator 401 to a postcoding process (bit operation) different from that of the data postcoder 402, and produces an output signal 413. This postcoding process corresponds to a data sync signal detection method to assure an optimum detection of a data sync signal.

The output signal 413 of the data sync postcoder 403 is input to a data sync signal detector 404 which detects a data sync signal by comparing the signal with a predetermined sync pattern. Upon detection of a sync signal, a sync signal detection output 414 is produced and gives a timing for decoding a postcoded output signal 415 in a decoder 405 which outputs a decoded output data 416.

Even with this configuration, a further improvement in the detection rate of the data sync signal is desired in view of the fact that the data section is accompanied by an error correction code for correcting a discrimination error and that the requirement of increasing the amount of information recorded per unit area of an information recording medium as far as possible to reduce the cost necessitates the correct data reproduction even with a deteriorated reproduced signal quality.

A related technique is described in a reference entitled "Distance Enhancing Codes for E2PRML: Performance Comparison using Spinstand Data", by Steven G. McCarthy, Zachary A. Keirn, et al., IEEE. Trans. Magn. Vol. 33, No. 5, September 1997. This reference reports a research in which the performance of various codes for improving the reproduction performance are compared using spindstand data. In this reference, a method of producing the coding gain of 2.2 dB is disclosed in which the (1, 7) code constituting the (d, k) code having a code rate of 2/3 is combined with a Viterbi decoder of EEPRML (extended extended partial response with maximum likelihood detection) type having a reduced number of states to enhance the inter-code minimum square distance from 6 to 10 without considering the code rate loss. In this method, however, the code rate is as low as 2/3. Thus, the bit interval is required to be reduced as compared with other codes of high code rate for recording the same amount of information, and therefore the performance cannot be improved.

JP-A-8-096312, on the other hand, discloses a method in which a pattern having no continuous data inversion is used as a data sync signal.

Further, JP-A-11-251927 discloses a method for discriminating the data sync signal (sync bytes) and the data code string in the configuration of what is called the time varying MTR (maximum transition run) trellis. According to this method, the data sync signal is detected regardless of the time limit, while the data code string is detected according to a time limit. Also in this case, the detection of the data sync signal is dependent on the limit of the data code string, and what can be achieved is not more than the trellis with the limited path of the time varying MTR trellis of the data code string. In other words, since the decoding of a time limited code is presupposed, the data sync signal can be detected in a state equivalent to the highest detection accuracy in the state of the data code, but the data sync signal cannot be detected with higher accuracy than for the data code discrimination.

Furthermore, JP-A-11-339403 discloses a method in which the state of a Viterbi decoder is limited when decoding the signal in the VFO (variable frequency oscillator) field corresponding to the PLO sync section according to the invention described later. In this method, however, although the accuracy can be improved for the bit sync (i.e. the clock reproduction) for the data, the detection performance of the data sync signal cannot be improved in view of the fact that the data sync signal is detected by detecting the data start position in the same state of the Viterbi decoder as when the data portion is detected. The performance can be improved only slightly by the fact that the bit sync accuracy for the data is improved for a higher accuracy of clock reproduction.

SUMMARY OF THE INVENTION

Accordingly, the object of the present invention is to detect the data sync signal with higher accuracy and thereby to improve the detection rate.

According to a first aspect of the invention, there is provided an information recording and reproducing apparatus comprising a data discriminator including data discrimination means and sync signal discrimination means, wherein the detection of the data sync signal is carried out for a discriminated bit string output from the sync signal discrimination means while at the same time carrying out the data demodulation for a discriminated bit string output from the data discrimination means. As a result, the discrimination of the data sync signal and the data reproduction and demodulation can be carried out in the way most suitable for each of the data sync signal and the data. Thus, an accurate data sync signal detection with only a small amount of error is made possible, and the detection performance of the data sync signal can be improved while maintaining the data discrimination performance. In the case where the Viterbi decoder is used as the data discrimination means and the sync signal discrimination means for optimization described above, the number of states, the number of paths for state transition and the path memory length can be optimized.

According to a second aspect of the invention, there is provided an information recording and reproducing apparatus comprising a single (shared) data discrimination means, wherein the configuration of the data discrimination means is switched thereby to switch the discrimination characteristic using the data sync signal detection output obtained by data sync signal detection. With this configuration, the circuit size can be reduced. Also, during the data sync signal detection and the data demodulation following the data sync signal, the discrimination means is temporally optimized in a form suitable for the data sync signal discrimination and detection on the one hand and the data reproduction and demodulation on the other hand, respectively. In this way, the detection performance of the data sync signal can be improved while maintaining the data discrimination performance. Further, using a Viterbi decoder as data discrimination means, the configuration can be switched to optimize the number of states, the number of paths for state transition and the path memory length for each of data discrimination and sync signal discrimination.

Furthermore, delay means for delaying the input data to the data discrimination means can be provided to apply the output of the delay means to the data discrimination means by the sync signal detection signal output from the data sync signal detection means. This configuration makes it possible to effectively use the data corresponding to the delay time required for discrimination in the data discrimination means when switching the configuration of the data discrimination means.

In any of the aforementioned cases, some path convergence patterns are required for converging the discrimination of the data sync signal correctly, and the particular patterns are required to be written in an information recording medium.

According to a third aspect of the invention, in order to eliminate the path convergence pattern, the head of the data section following the data sync signal is coded by a first data coding scheme coincident with the limitation of the signal string of the data sync signal and recorded and reproduced in and from the information recording medium, while the remaining data are coded by a second data coding scheme for improving the data recording and reproduction performance, and recorded and reproduced in and from the information recording medium. Also in this case, the use of a Viterbi decoder as data discrimination means makes it possible to optimize the number of states, the number of paths for state transition and the path memory length for each of the data discrimination means and the sync signal discrimination means or each of the time for the data discriminating operation and the sync signal discriminating operation.

According to a fourth aspect of the invention, the characteristics of a low-pass filter and the equalizing means providing signal processing means are switched to optimized ones for the sync signal and the data by the sync signal detection output. Also in this case, wasteful data can be reduced by providing delay means in the input portion of the equalizing means for delaying the input signal of the equalizing means and inputting the output of the delay means to the equalizing means by the sync signal detection signal output from the data sync signal detection means.

According to a fifth aspect of the invention, the signal processing means includes storage means for storing digitized information, information after equalization and information after discrimination. When storing the information, the data sync signal is detected. According to the timing of data sync signal detection, the position of information output from the storage means is determined and the information is output thereby to perform the data discrimination and the data demodulation. In case of failure to detect the data sync signal at the first detecting session, the information for data sync detection is stored together in the storage means, and by outputting the particular information from the storage means, the data sync signal can be detected for different characteristics of the equalizing means and the data discrimination means.

As a predetermined data sync signal, the data sync signal having no continuous inversion of the data recorded in the recording medium is selectively used.

DESCRIPTION OF THE EMBODIMENTS

Figure 1:
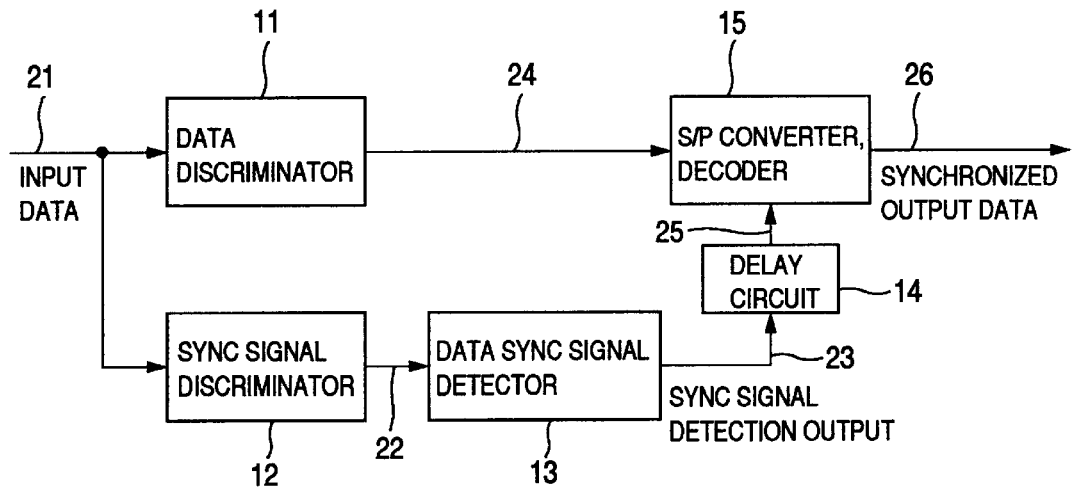
FIG. 1 is a diagram showing a configuration of a data sync signal detector according to a first embodiment of the invention.

A data sync signal detector according to a first embodiment of the invention will be explained with reference to FIGS. 1 to 5. First, in the data sync signal detector shown in FIG. 1, input data 21 are input to a data discriminator 11 and a sync signal discriminator 12. The data discriminator 11 discriminates the data in the input data 21 and produces a data discrimination output 24 as a discriminated code bit output. The sync signal discriminator 12 processes the input data 21 for data discrimination and produces a sync signal discrimination output 22 as a discriminated code bit output. A data sync signal detector 13 is supplied with the sync signal discrimination output 22, detects the data sync signal in the input data 21 and produces a sync signal detection output 23. The conventional method can be applied directly to the detection of the data sync signal in the data sync signal detector 13.

A delay circuit 14 delays the sync signal detection output 23 by a predetermined length of time and outputs a sync signal delay output 25. A serial-to-parallel converter or a decoder 15 is supplied with the sync signal delay output 25 and the data discrimination output 24. The sync signal detection output 23 gives a reference timing for the serial-to-parallel converter or the decoder 15 to convert the data discrimination output 24 into parallel bits or a reference timing for the decoder 15 to decode the data discrimination output 24. The serial-to-parallel converter or the decoder 15 performs the serial-to-parallel conversion or the decoding operation based on the timings given by the sync signal detection output 23 and outputs a synchronized output data 26.

The sync signal detection output 23 is delayed in the delay circuit 14 for the purpose of adjusting the timing by absorbing the difference of delay time between the data discriminator 11 and the sync signal discriminator 12 or absorbing the delay time corresponding to the path convergence pattern section 33 of FIG. 4 described later. As long as the delay time of the data discriminator 11 and the sync signal discriminator 12 are adjusted in advance to assure the coincidence of timing between them, therefore, the delay circuit 14 is not required. In the case where the delay time for producing the sync signal detection output 23 is larger than the delay time for producing the data discrimination output 24, on the other hand, a delay circuit is required for the data discrimination output 24.

Also, although not shown clearly in FIG. 1, a postcode processing unit corresponding to the coding scheme used or the preceding process for recording is added to the interior or to the output portion of the data discriminator 11 and the sync signal discriminator 12.

Further, the data discriminator 11 and the sync signal discriminator 12 shown in FIG. 1 are implemented with different discrimination performances, as will be explained below with reference to FIGS. 2 and 3.

Figure 2:
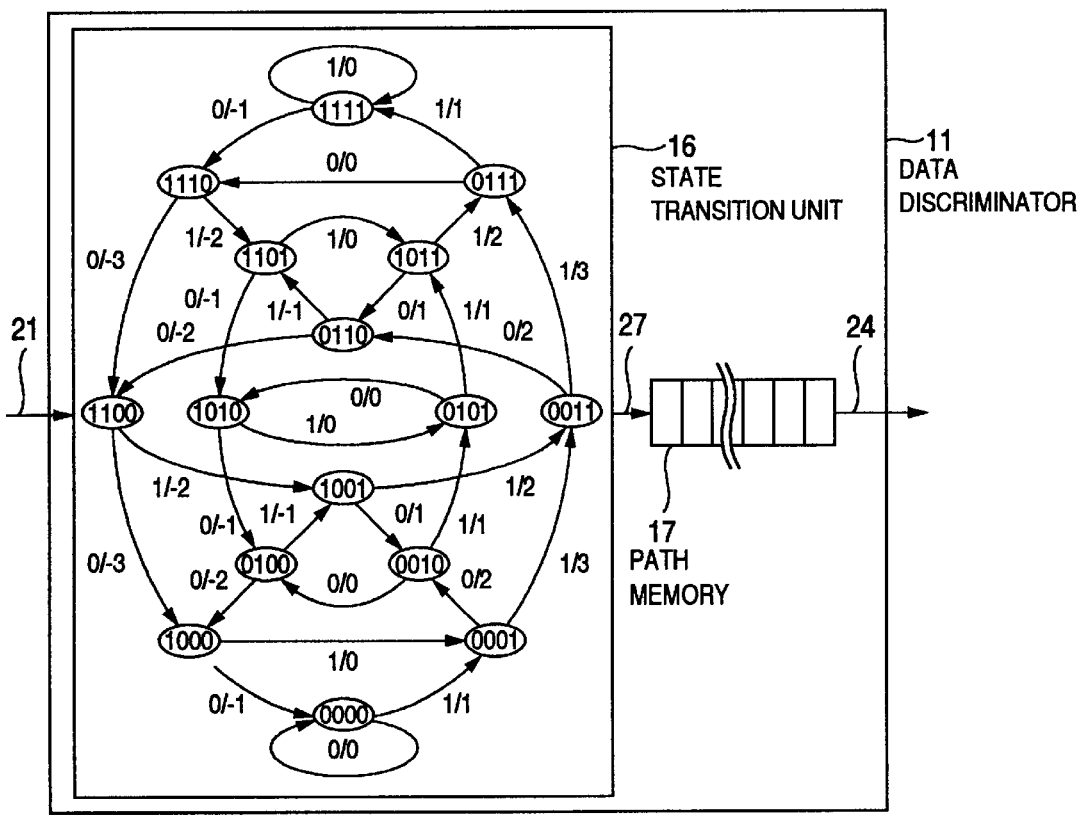
FIG. 2 is a diagram for explaining the configuration of the data discriminator according to the first embodiment.

FIG. 2 shows a configuration of the data discriminator 11. As shown in FIG. 2, the data discriminator 11 includes a state transition unit 16 for realizing the state transition for data discrimination and a path memory 17 for establishing the information on the result of determination in the state transition unit 16. The input data 21 to the data discriminator 11 is applied to the state transition unit 16. FIG. 2 represents the state transition for realizing EEPRML in the state transition unit 16, of which the internal state is indicated by 16 ellipses designated by four-digit numerical characters "0000" to "1111" using 0 and 1. Each state is connected by a line with arrow, in the direction of which the state can be transferred along the line. Each line with arrow is accompanied by an output/input value, according to which state transition is carried out.

From state "0000", for example, two state transitions are possible. In the case where the input is "0", "0" is output to return to "0000", or in the case where the input is "1", "1" is output to transfer to "0001". From the state "0001", two state transitions are possible, also. In the case where the input is "2", "0" is output to transfer to "0010", or in the case where the input is "3", "1" is output to transfer to "0011". This is also the case with states "0010" to "1111".

The arithmetic operation of each state transition is performed based on the input data 21. This arithmetic operation is specifically realized by an add compare select circuit. A selected output 27 for each state transition is input to the path memory 17 in which the discrimination data are sequentially established. The data established in the path memory 17 is produced as a data discrimination output 24. The data establishment in the path memory 17 requires a time length which depends on the coding scheme used.

Figure 3:
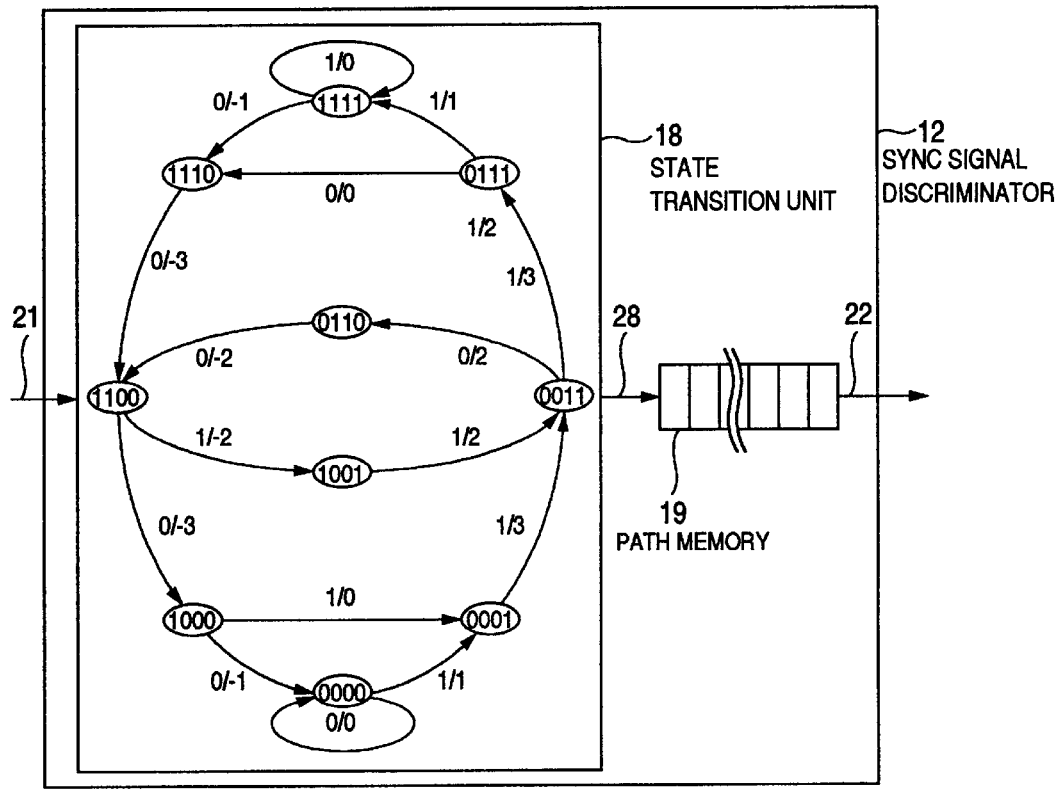
FIG. 3 is a diagram for explaining the configuration of the sync signal discriminator according to the first embodiment.

FIG. 3 shows a configuration of the sync signal discriminator 12. The sync signal discriminator 12 includes a state transition unit 18 for realizing the state transition optimized for discrimination of the data sync signal and a path memory 19 for establishing the information on the result of determination at the state transition unit 18. The input data 21 applied to the sync signal discriminator 12 is input to the state transition unit 18.

FIG. 3 shows the state transition for realizing EEPRML for the state transition unit 18 as in FIG. 2. The ten ellipses described with four digits of 0 and 1 as "0000" to "1111" indicate the internal state. There are ten internal states by reason of the fact that the data sync signal is equivalent to a bit string pattern with no continuous data inversion, i.e. the code (d, k) with d as "1". Also, each state is connected by a line with arrow, in the direction of which the state can be transferred along the associated line. Each line with arrow is accompanied with an output/input value by which the state transition is carried out.

From state "0000", for example, two state transitions are possible. In the case where the input is "0", "0" is output to return to "0000". In the case where the input is "1", "1" is output to transfer to "0001". From state "0001", on the other hand, only one state transition is possible. In the case where the input is "3", "1" is output to transfer to "0011". The state "0010" existing in FIG. 2 has disappeared. This is also the case with other eight states "0011" to "1111". The arithmetic operation of each state transition is performed based on the input data 21. This arithmetic operation is specifically realized by an add compare select circuit. Because of a smaller number of states and transition paths, however, the circuit configuration is simplified as compared with the case of FIG. 2.

The select output 28 for each state transition is output to the path memory 19, where the discrimination data are sequentially established. The data thus established in the path memory 19 are output as a sync signal discrimination output 22. The data establishment in the path memory 19 requires some time, which depends on the coding scheme used. In the case under consideration, however, the path memory 19 can be shortened as compared with the path memory 17 shown in FIG. 2 in view of the fact that the data sync signal is equivalent to the (d, k) code with d as "1" on the one hand and a well-known fixed bit string is employed as a data sync signal on the other hand.

Also, as to the signal discrimination performance of the sync signal discriminator, as described in the reference of Steven G. McCarthy, et al. cited above, the coding gain of 2.2 dB can be achieved by changing the inter-code minimum square distance from 6 to 10. Since only the sync signal section is involved, however, the coding rate has no effect as in the cited reference. In other words, what is important is how many bits of information are recorded in the recording medium as a data sync signal for detecting the data sync signal, and the coding rate itself is has no significance in the case under consideration.

Thus, in respect of the data sync signal portion, the sync signal discrimination output 22 discriminated by the sync signal discriminator has a lower bit error rate than the data discrimination output 24 discriminated by the data discriminator, thereby leading to a smaller detection error of the data sync signal detected using the sync signal discrimination output 22.

Figure 4:
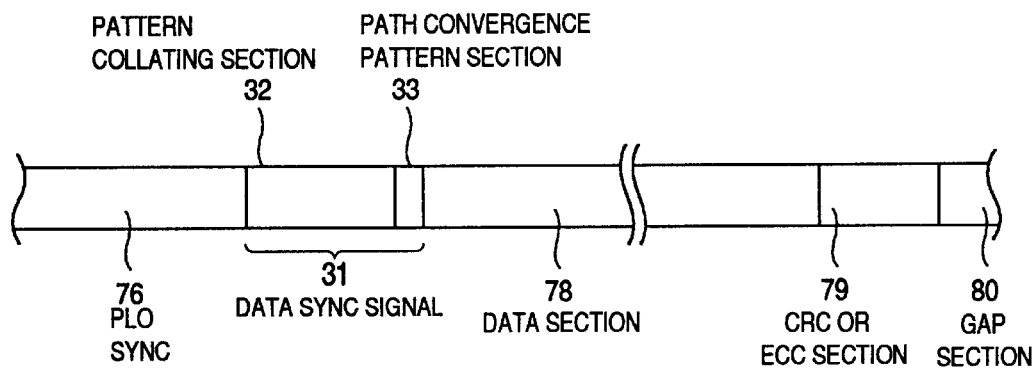
FIG. 4 is a diagram showing a data format according to the first embodiment.

FIG. 4 shows an example of a data format used in the first embodiment. The data is recorded in or reproduced from each sector of the recording medium constituting a unit storage area. Each sector includes a PLO sync section 76 for PLL pull-in, a data sync signal 31 for producing a decode timing signal of the modulated code by detecting the starting position of a data section 78, the data section 78 for actually recording and reproducing data, and a CRC or ECC 79 for detecting or correcting an error, respectively. A gap 80 making up a pattern for absorbing various delay time is interposed between the sectors.

The data sync signal 31 includes a pattern collating section 32 for actually collating the data sync signal with a detection pattern, and a path convergence pattern section 33 required for correctly establishing in the path memory 19 the output of the sync signal discrimination output 22 discriminated by the sync signal discriminator 12.

The necessity of this structure of the data sync signal 31 will be explained in more detail. Upon discrimination of the data section by the sync signal discriminator 12 shown in FIG. 3, the absence of the required state or transition path in the data section necessarily leads to an error. This also occurs in the boundary between the data sync signal and the data.

First, consider a structure lacking the convergence pattern section 33 as in the prior art. For establishing in the path memory 19 the discrimination data in the last part of the pattern collating section 32, the input data 21 corresponding to the data section 78 is required to be applied to the sync signal discriminator 12. The signal in the data section 78, however, causes a discrimination error, as described above. Thus, the discrimination of not only the data section but the pattern collating section 32 in the path memory 19 before establishment are affected and a discrimination error is caused. This also deteriorates the effect of improving the detection performance of the data sync signal by dividing the data discrimination means into the data discriminator 11 and the sync signal discriminator 12.

The discrimination of the pattern collating section 32 is made possible without being affected by the data section 78 by inserting the convergence pattern section 33 as shown in FIG. 4. Again, although the pattern collating section 32 presupposes the use of a pattern having no continuous inversion of the recording data, the data pattern with continuous inversion may be present in the head data of the data section 78, in which case the absence of the path convergence pattern section 33 may make it impossible for the sync signal discriminator 12 to correctly discriminate the pattern of the pattern collating section 32. For this reason, the convergence pattern section 33 of a pattern having no continuous inversion of the recording data is inserted following the pattern collating section 32 thereby to make sure that no error occurs for discriminating the pattern of the pattern collating section. The path convergence pattern section has a pattern without any continuous inversion having a length required for discriminating the pattern of the pattern collating section 32 correctly.

Qualitatively, the data sync signal and the data signal in the data section are so related to each other that the data sync signal is configured of a pattern having not more than m (=0, 1, 2 or 3) continuous inversions of the information recorded in the recording medium for recording the particular data sync signal, while the data signal is configured of a pattern having not more than n continuous inversions of the information recorded in the recording medium for recording the particular data signal, where m is smaller than n.

Any arbitrary pattern having the same code restriction as the pattern collating section 32 can be used for the path convergence pattern section 33. In the case under consideration, however, the pattern is assumed to be the same as that of the PLO sync section 76 for assuring quick convergence of discrimination. Also, the pattern collating section 32 and the path convergence pattern section 33 are combined into the data sync signal 31 to secure the apparently same format structure as in the prior art. Nevertheless, the path convergence pattern section 33 can be separated from the data sync signal 31 as an independent pattern section for preventing the interference of an error which may occur from the data section.

Figure 5:
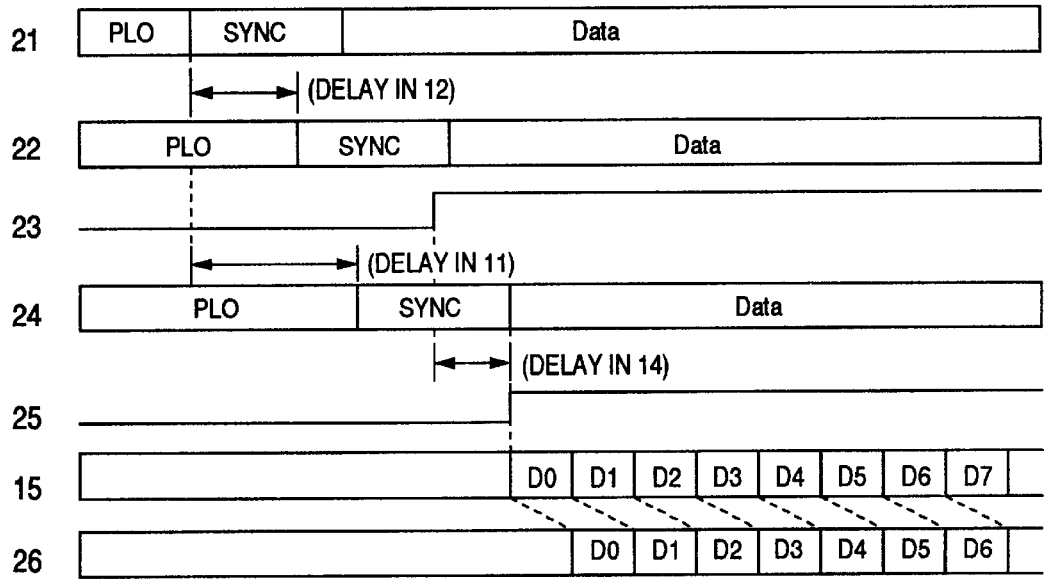
FIG. 5 is a diagram for explaining the signals at the various parts according to the first embodiment shown in FIG. 1.

FIG. 5 shows examples of signals in the various parts of the configuration according to the first embodiment of the invention shown in FIG. 1. The numerals on the left side in the drawing coincide with the numerals designating the signals of the various parts of FIG. 1, respectively, and the apparatus according to the first embodiment operate on this time chart.

First, the input data 21 is shown. "PLO" indicates the signal portion corresponding to the PLO sync section 76 of FIG. 4, "SYNC" the signal portion corresponding to the data sync signal 31 of FIG. 4, and "Data" the signal portion corresponding to the data section 78 of FIG. 4. An input data 21 is followed by a sync signal discrimination output 22 delayed by the same amount as the delay in the sync signal discriminator 12, and a detection output 23 of the sync signal detected by the data sync signal detector 13 using the discrimination signal 22. A data discrimination output 24 is also shown and delayed by an amount equal to the delay time of the data discriminator 11. Further, a sync signal delay output 25 is the sync signal detection output 23 delayed by the delay circuit 14. A synchronized output data 26 is internally processed in and produced from the serial-to-parallel converter or the decoder 15.

Figure 17A:
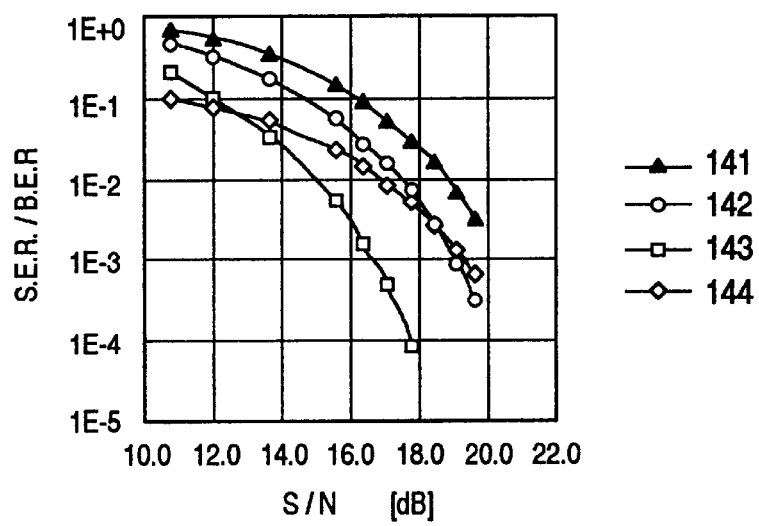
FIGS. 17A and 17B are diagrams showing a characteristic of the first embodiment of the invention.
Figure 17B:
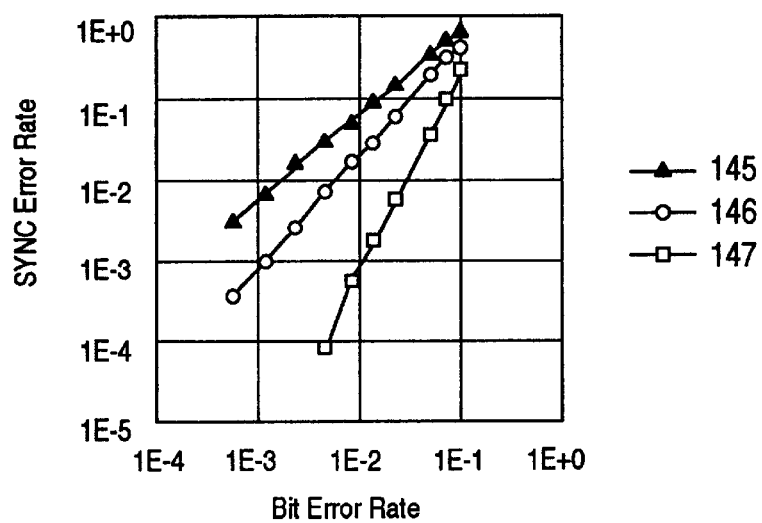

The effects of the first embodiment of the invention will be specifically described with reference to FIGS. 17A, 17B and 18A, 18B. FIGS. 17A, 17B show graphs representing the performance achieved by computer simulation in the case where the 18-bit sync pattern (corresponding to "001100000011011110") disclosed in JP-A-2000-100084 and the detection method thereof are used for the data sync signal detector 13 in the first embodiment.

Figure 28:
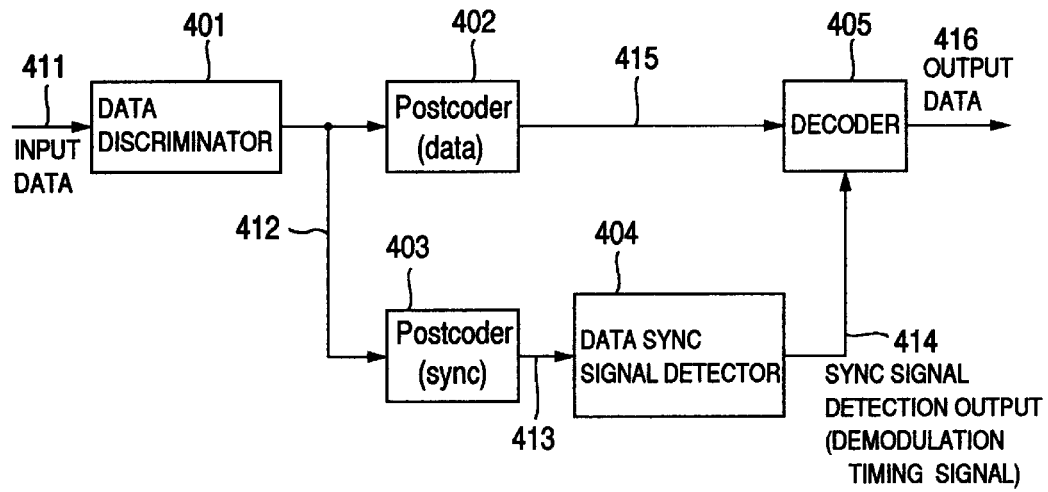
FIG. 28 is a diagram showing a configuration of the conventional data sync detector.

In FIG. 17A, the abscissa represents a signal-to-noise ratio of the input data 21 of the data discriminator 11 and the sync signal discriminator 12 or the input data 411 of FIG. 28, and the ordinate the bit error rate (BER) of the data discrimination output 24, the error rate (SER) of the sync signal detection output 23 or the error rate (SER) of the sync signal detection output 414 of FIG. 28.

The characteristic curve 144 represents the bit error rate of the data in the data discrimination output 24. This characteristic assumes that the data are random. The characteristic curve 141, on the other hand, represents the error rate of the sync signal detection output 23 obtained in the case where the data sync signal is detected under the condition that all the 18 bits of the sync pattern of the data sync signal detector 13 are coincident in the configuration of the first embodiment shown in FIG. 1. The characteristic curve 142 represents the error rate of the sync signal detection output 414 obtained in the case where the data sync signal detector 404 uses the method disclosed in JP-A-2000-100084 in the conventional configuration shown in FIG. 28. The characteristic curve 143 represents the error rate of the sync signal detection output 23 obtained in the case where the data sync signal is detected by the data sync signal detector 13 according to the method disclosed in JP-A-2000-100084 in the configuration of the first embodiment shown in FIG. 1.

The input data 21 of FIG. 1 has a characteristic equivalent to that of the input data 411 of FIG. 28, the data discriminator 11 of FIG. 1 to that of the data discriminator 401 of FIG. 28, and the data discrimination output 24 of FIG. 1 to that of the output signal 415 of FIG. 28.

In FIG. 17B, the abscissa represents the bit error rate of the data discrimination output 24, and the ordinate the error rate of the sync signal detection output 23 and the sync signal detection output 414. This derives from the conversion by rewriting the graph of FIG. 17A with the characteristic curve 144 on the abscissa. The characteristic curve 145 corresponds to the characteristic curve 141, the characteristic curve 146 to the characteristic curve 142, and the characteristic curve 147 to the characteristic curve 143.

Figure 18A:
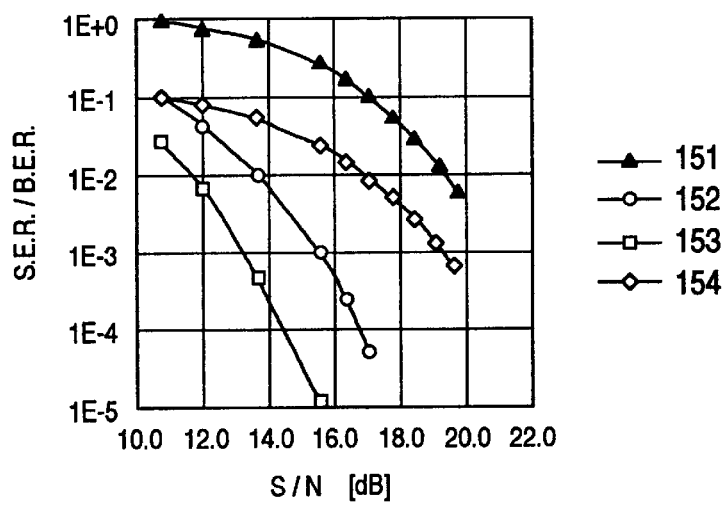
FIGS. 18A and 18B are diagrams showing another characteristic of the first embodiment of the invention.
Figure 18B:
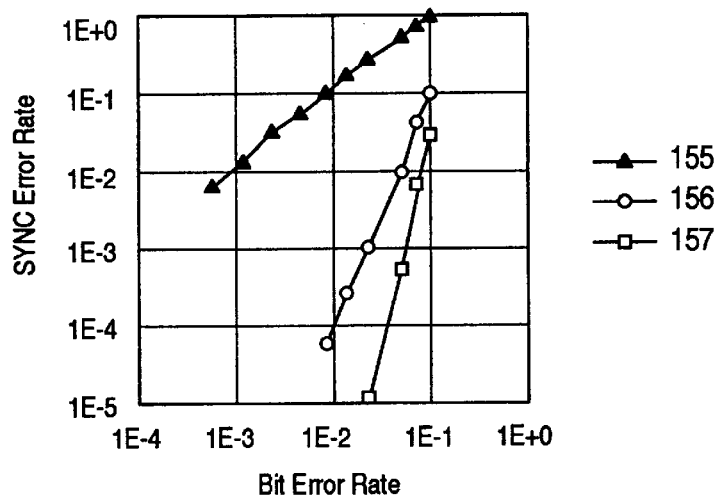

FIGS. 18A, 18B are graphs plotted by computer simulation representing the performance of the data sync signal detector 13 using a 36-bit sync pattern (corresponding to "001100000011011110" and "110011011000011110") disclosed in JP-A-2000-100084 and the detection method according to the first embodiment.

In FIG. 18A, the abscissa represents the signal-to-noise ratio of the input data 21 of the data discriminator 11 and the sync signal discriminator 12 or the input data 411 of FIG. 28, and the ordinate represents the bit error rate of the data discrimination output 24 and the error rate of the sync signal detection output 23 or the error rate of the sync signal detection output 414 of FIG. 28. The characteristic curve 154 represents the bit error rate of the data in the data discrimination output 24. This is a characteristic assuming that the data is random. The characteristic curve 151 represents the error rate of the sync signal detection output 23 of the data sync signal detector 13 in the case where the data sync signal is detected under the condition that all the 36 bits of the sync pattern are coincident in the configuration of the first embodiment (FIG. 1). The characteristic curve 152 represents the error rate of the sync signal detection output 414 of the data sync signal detector 404 using the method disclosed in JP-A-2000-100084 in the conventional configuration shown in FIG. 28. The characteristic curve 153 represents an error rate of the sync signal detection output 23 of the data sync signal detector 13 in the case where the data sync signal is detected by the method disclosed in JP-A-2000-100084 in the configuration according to the first embodiment (FIG. 1).

The input data 21 of FIG. 1 has a characteristic equivalent to that of the input data 411 of FIG. 28, the data discriminator 11 of FIG. 1 to that of the data discriminator 401 of FIG. 28, and the data discrimination output 24 of FIG. 1 to that of the output signal 415 of FIG. 28.

In FIG. 18B, the abscissa represents the bit error rate of the data discrimination output 24, and the ordinate the error rate of the sync signal detection output 23 and the sync signal detection output 414. This derives from the conversion by rewriting the graph of FIG. 18A with the characteristic curve 154 on the abscissa. The characteristic curve 155 corresponds to the characteristic curve 151, the characteristic curve 156 to the characteristic curve 152, and the characteristic curve 157 to the characteristic curve 153.

In all the cases of FIGS. 17A, 17B and FIGS. 18A, 18B, the method according to the invention is seen to achieve an improvement of more than about 2 dB in terms of the signal-to-noise ratio as compared with the conventional method. Specifically, in FIG. 17A, comparison between the characteristic curve 143 representing the sync signal detection output 23 of FIG. 1 according to the invention and the characteristic curve 142 representing the sync signal detection output 414 of FIG. 28 according to the prior art in terms of the level of the error rate 1E-3 shows that the input data 21 has a SIN about 2 dB lower. In other words, according to this invention, it is seen that even with the input data 21 having a S/N about 2 dB lower, almost the same error rate can be secured by the sync signal detection output 23 as compared with the sync signal detection output 414 of FIG. 28. It is also seen as another advantage that the conventional data sync signal detection method is applicable directly to the data sync signal detector. Further, the data error attributable to the error of the data sync information can be reduced in the signal processing circuit, the information recording and reproducing apparatus and the information transmission system using the data signal detector according to the invention.

Figure 6:
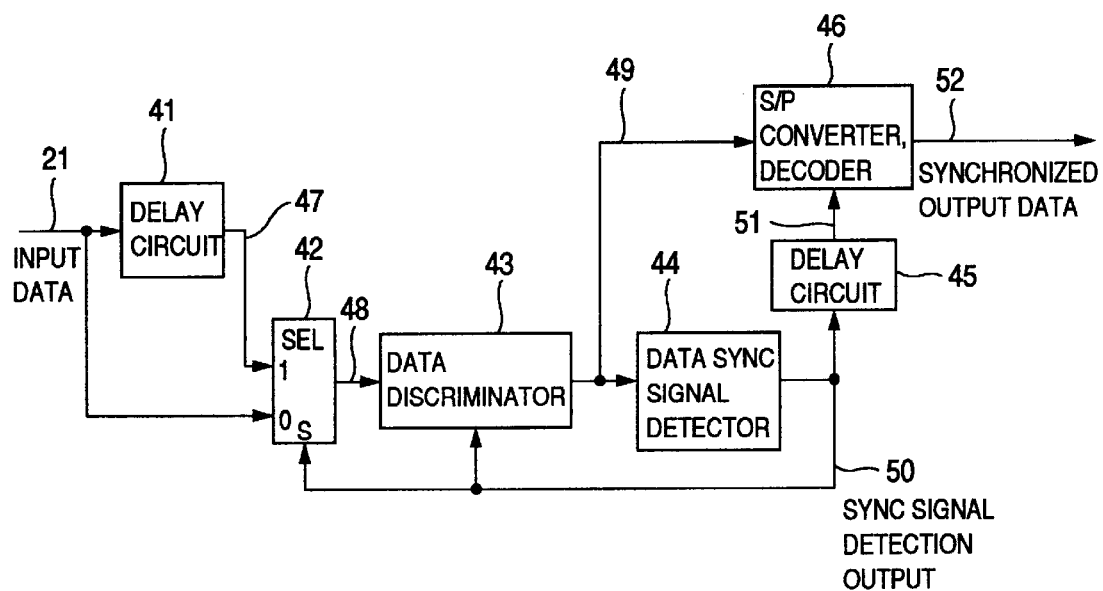
FIG. 6 is a diagram showing a configuration according to a second embodiment of the invention.

Now, a second embodiment of the invention will be explained with reference to FIGS. 6 to 8. According to this embodiment, as shown in FIG. 6, the input data 21 is applied to a delay circuit 41 and a signal selector 42. The input data delay output 47 produced as the input data 21 delayed in the delay circuit 41 is applied to the other input terminal of the signal selector 42. The signal selector 42 selects the signal of the input data 21 or the input data delay output 47, and produces the selected signal as an input data select output 48. The input data select output 48 is applied to a data discriminator 43.

The data discriminator 43 produces a data discrimination output 49 as the result of discrimination. The data discrimination output 49 is applied to a data sync signal detector 44 and a serial-to-parallel converter or a decoder 46. The data sync signal detector 44 detects the data sync signal in the input data 21 and produces a sync signal detection output 50. The conventional method is directly applicable for detecting the data sync signal in the data sync signal detector 44.

The sync signal detection output 50 is applied to the delay circuit 45, the signal select circuit 42 and the data discriminator 43. In the signal select circuit 42, the output is switched from the signal of the input data 21 to the signal of the input data delay output 47 by the sync signal detection output 50. Also, in the data discriminator 43, the configuration of the data discriminator is switched from that for sync signal detection to that for data discrimination by the signal detection output 50. This is equivalent to the provision of two discriminators including the data discriminator 11 and the sync signal discriminator 12 in the first embodiment, and achieves the same detection performance with a single data discriminator 43. After the sync signal detection output 50 is output, the data discrimination can be carried out again from the head of the data by the data discriminator 43 having a configuration for data discrimination using the input data delay output 47. The delay circuit 45 delays the sync signal detection output 50 by a predetermined time and outputs a sync signal delay output 51.

The serial-to-parallel converter or the decoder 46 is supplied with the sync signal delay output 51 and the data discrimination output 49. The sync signal detection output 50 gives to the serial-to-parallel converter or the decoder 46 a reference timing for converting the data discrimination output 49 to parallel bits or a reference timing for decoding the data discrimination output 49. The serial-to-parallel converter or the decoder 46 carries out the serial-to-parallel conversion or decoding at the timing given by the sync signal delay output 51 and produces the synchronized output data 52.

The input data 21 is delayed in the delay circuit 41 described above for the purpose of causing the data discriminator 43 to carry out the data discrimination again from the head portion of the data section 78 after the sync signal detection output 50 is produced. In other words, the purpose is to secure a delay time of the data discriminator 43 at the time of data sync signal detection, to secure a delay time until the production of the sync signal detection output 50 in the data sync signal detector 44 and further to secure a delay time corresponding to the delay time for absorbing the effect of the discrimination error caused by the discontinuous switching of the input of the data discriminator 43 by the signal selector 42 regardless of the original reproduced signal.

The sync signal detection output 50 is delayed in the delay circuit 45 described above for the purpose of absorbing the delay time before the head portion of the data in the data section 78 is input to the serial-to-parallel converter or the decoder 46 when the input data delayed by the delay circuit 41 is discriminated by the data discriminator 43. Although the postcoding means is not expressly described also in this case, a postcode processing unit corresponding to the coding scheme used or the precoding process for recording is added to the interior or the output portion of the data discriminator 43. Further, the structure of the data discriminator 43 is switched between the data sync signal detection and the data discrimination by the sync signal detection output 50, thereby realizing different discrimination performances therebetween. This will be explained in detail with reference to FIG. 7.

Figure 7:
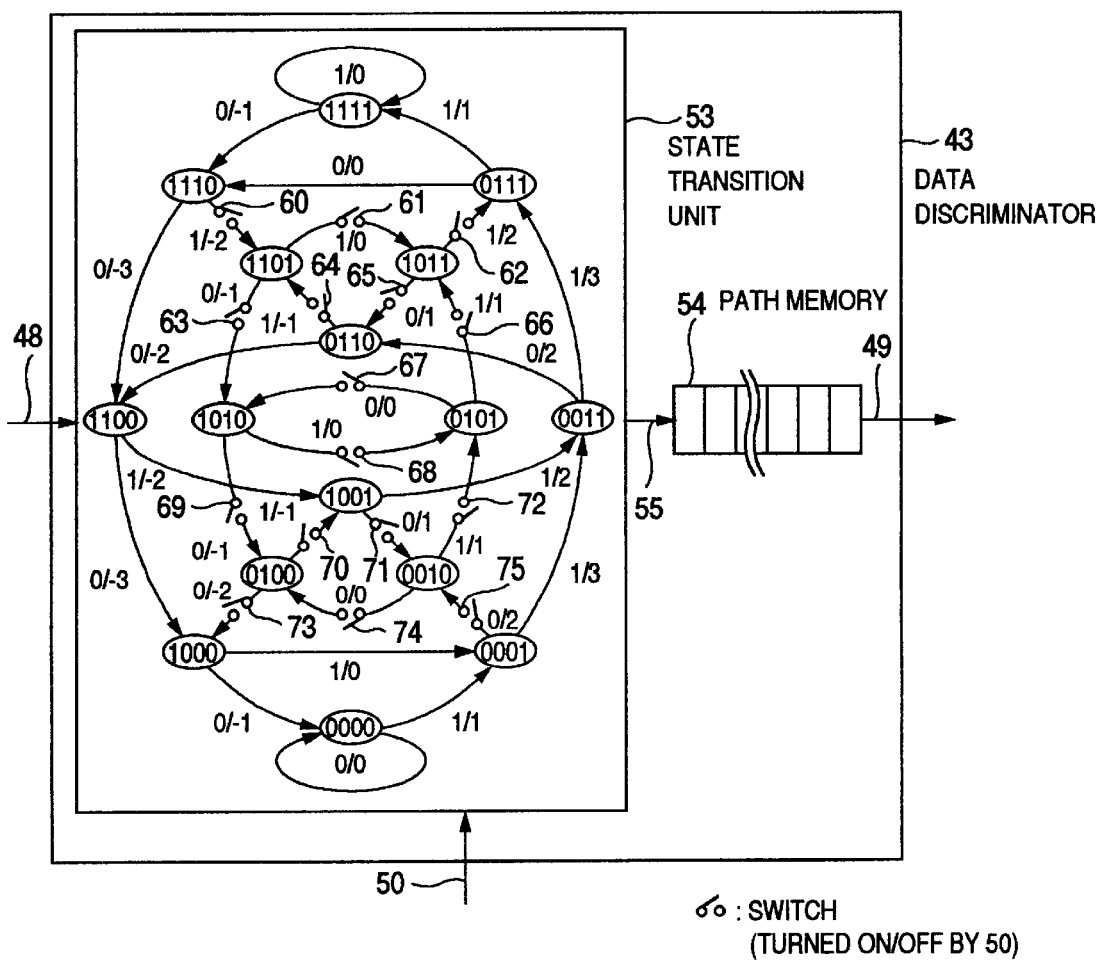
FIG. 7 is a diagram for explaining the configuration of the data discriminator according to the second embodiment.

As shown in FIG. 7, the data discriminator 43 includes a state transition unit 53 for realizing the state transition for discriminating the data and the data sync signal and a path memory 54 for establishing the information on the determination result of the state transition unit 53. The input data select output 48 applied to the data discriminator 43 is applied to the state transition unit 53.

FIG. 7 shows the state transition for realizing EEPRML for the state transition unit 53, which has a configuration substantially similar to the state transition unit 16 shown in FIG. 2 except that the state transition unit 53 has switches (designated by 75, for example, on the path from state "0001" to state "0010") on the transition paths. There are a total of 16 switches including switches 60 to 75. These 16 switches are controlled by the sync signal detection output 50, so that they remain open before the detection of the sync signal detection output 50 and are closed upon detection of the sync signal detection output 50.

This is equivalent to switching the configuration of the state transition unit 16 and the state transition unit 18 shown in FIGS. 2 and 3, respectively, by the sync signal detection output 50. In other words, when the switches 60 to 75 are open, the configuration of the state transition unit 53 is equivalent to the state transition unit 18, while when the switches 60 to 75 are closed, the configuration of the state transition unit 53 is equivalent to the state transition unit 16. Thus, this embodiment has the same effect as the first embodiment.

The select output 55 at the time of each state transition is applied to the path memory 54 where the discrimination data are established sequentially. The data that have been established in the path memory 54 are produced as a data discrimination output 49. The data establishment in the path memory 54 requires considerable time, which depends on the coding scheme used.

The second embodiment of the invention also uses the data format shown in FIG. 4. The data sync signal 31 further has the function of absorbing the effect of the discrimination error which may be caused in the data discriminator 43 according to the input data select output 48 switched discontinuously by the signal selector 42 regardless of the original reproduced signal upon detection of the sync signal detection output 50.

Figure 8:
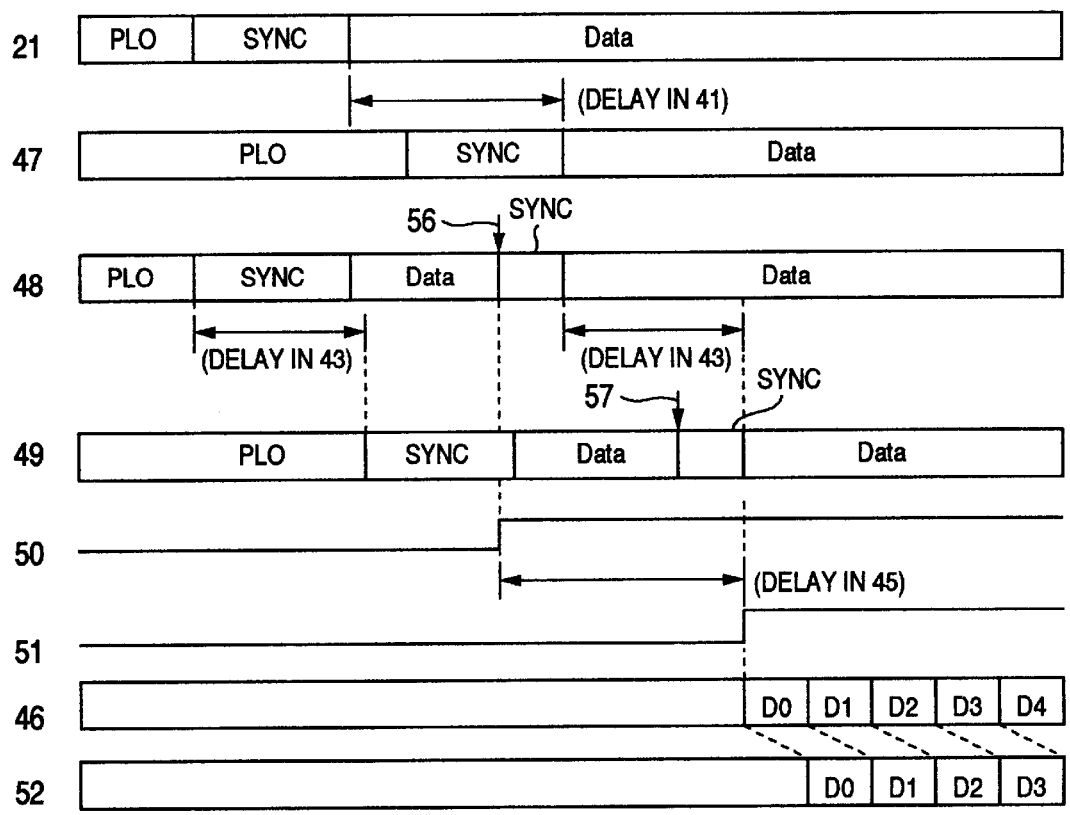
FIG. 8 is a diagram for explaining the signals at the various parts according to the second embodiment shown in FIG. 6.

FIG. 8, like FIG. 5, shows an example of signals produced at various parts in the configuration according to the second embodiment of the invention shown in FIG. 6. The numerals in the left portion of the drawing are coincident with the numbers of the signals produced at various parts of FIG. 6, and the apparatus according to the second embodiment operates on this time chart.

First, in the input data 21, "PLO" is a signal portion corresponding to the PLO sync section 76 in FIG. 4, "SYNC" a signal portion corresponding to the data sync signal 31 of FIG. 4, and "Data" a signal portion corresponding to the data section 78 of FIG. 4. Then comes an input data delay output 47 delayed by the delay circuit 41. This is followed by an input data select output 48 selected by the signal selector 42. In this data, an arrow 56 indicates the position where the data is discontinuously switched by the signal selector 42 regardless of the original reproduced signal. The signal corresponding to the portion amid the data sync signal 31 and the data section 78 appears in the portion subsequent to arrow 56.

Then, the discriminated data discrimination output 49 is produced by being delayed by an amount corresponding to the delay in the data discriminator 43. The position where the data is discontinuously switched by the sync signal detection output 50 regardless of the original reproduced signal appears at the position indicated by arrow 57. Before and after the particular position, a structural discrimination error occurs. In view of the configuration in which the signal before the path convergence pattern section 33 of the data sync signal 31 is input again, however, the discrimination of the data section 78 is not affected. Then, the sync signal detection output 50 is shown. This output 50 rises at a position corresponding to the pattern collator 32 of the data sync signal 31 in the beginning of the data discrimination output 49, thereby indicating that the data sync signal could be detected. At this particular position, the signal is switched as indicated by arrow 56.

Then comes the sync signal delay output 51 constituting the sync signal detection output 50 delayed by the delay circuit 45. At the rise point of this signal, the serial-to-parallel converter or the decoder 46 obtains an operation timing and starts operation. The manner in which the signal is processed internally of the serial-to-parallel converter or the decoder 46 and the synchronized output data 52 produced from the serial-to-parallel converter or the decoder 46 are shown.

As described above, the second embodiment is so configured that the data discriminator 43 is switched by the switches 60 to 75, and the discriminator for discriminating the data sync signal doubles as the discriminator for discriminating the data. Thus, the circuit size is reduced.

Figure 25:
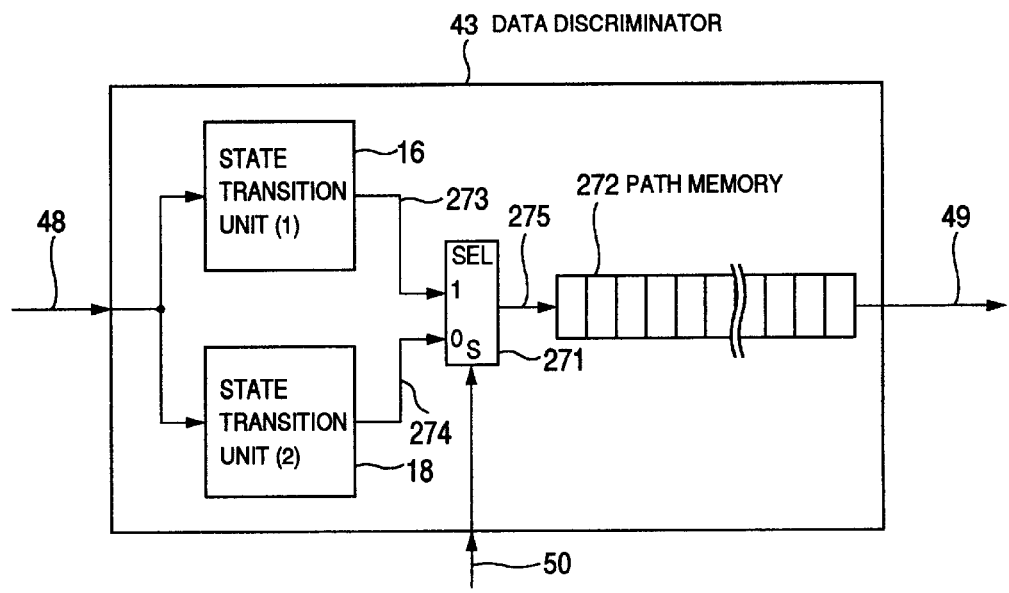
FIG. 25 is a diagram showing another configuration example of the data discriminator according to the second embodiment of the invention.

Another example of configuration of the data discriminator 43 according to the second embodiment is shown in FIG. 25. This configuration, like in the first embodiment described above, includes a state transition unit for data discrimination processing having a parallel arrangement of the state transition unit 16 and the state transition unit 18 for different state transitions, which share a path memory 272. The input to the path memory 272 is selected by the signal selector 271 using the sync signal detection output 50. Also this configuration can produce a similar performance.

Figure 9:
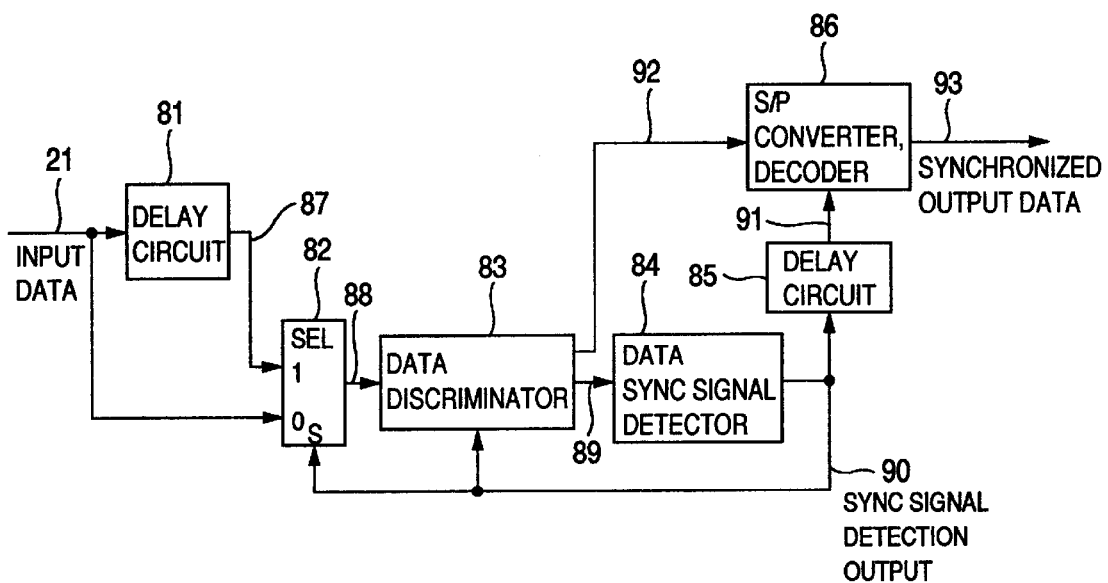
FIG. 9 is a diagram showing a configuration according to a third embodiment of the invention.

Now, a third embodiment of the invention will be explained with reference to FIGS. 9 to 11. First, referring to FIG. 9, the input data 21 is applied to the delay circuit 81 and the signal selector 82 according to this embodiment. The input data delay output 87 constituted of the input data 21 delayed by the delay circuit 81 is input from the other input terminal of the signal selector 82. The signal selector 82 selects the signal of the input data 21 or the signal of the input data delay output 87, and produces the selected signal as an input data select output 88. The input data select output 88 is applied to the data discriminator 83.

The data discriminator 83 discriminates the input data select output 88 and produces the sync signal discrimination output 89 and the data discrimination output 92. The sync signal discrimination output 89 is applied to the data sync signal detector 84. The data discrimination output 92 is applied to the serial-to-parallel converter or the decoder 86. The data sync signal detector 84 detects the data sync signal in the input data 21 and produces the sync signal detection output 90. The conventional method is applicable directly as a method of detecting the data sync signal in the data sync signal detector 84.

The sync signal detection output 90 is applied to the delay circuit 85, the signal selector 82 and the data discriminator 83. The signal selector 82 switches the output from the input data 21 to the signal of the input data delay output 87 by the sync signal detection output 90. Also, the data discriminator 83 switches the configuration of the data discriminator from that for detecting the data sync signal to that for data discrimination by the sync signal detection output 90. This is similar to the corresponding function of the second embodiment, and the same detection performance as in the first embodiment can be secured by the data discriminator 83. After the sync signal detection output 90 is produced, the data discrimination can be carried out again from the head portion of the data by the data discriminator 83 having a configuration for data discrimination using the input data delay output 87.

The delay circuit 85 delays the sync signal detection output 90 by a predetermined length of time and produces a sync signal delay output 91. The serial-to-parallel converter or the decoder 86 is supplied with the sync signal delay output 91 and the data discrimination output 92. The sync signal detection output 90 gives to the serial-to-parallel converter or the decoder 86 a timing for converting the data discrimination output 92 to parallel bits or a timing for decoding the data discrimination output 92. The serial-to-parallel converter or the decoder 86 performs the serial-to-parallel conversion or decoding, as the case may be, at the timing given by the sync signal delay output 91 and produces a synchronized output data 93.

The input data 21 is delayed by the delay circuit 81 for the same purpose as in the second embodiment. Also, the sync signal detection output 90 is delayed by the delay circuit 85 described above for the same purpose as in the second embodiment. By this delay, however, the difference in delay time between the sync signal discrimination output 89 and the data discrimination output 92 can be absorbed. Also, though not expressly described here, the postcoding means or the postcoding processing unit corresponding to the coding scheme used or the precoding processing for recording can be added to the interior or the output portion of the data discriminator 83.

Further, the configuration of the data discriminator 83 is switched, like in the second embodiment, at the time of data sync signal detection and at the time of data discrimination by the sync signal detection output 90. The output of the data discriminator 83 is divided into the sync signal discrimination output 89 and the data discrimination output 92. This will be explained with reference to FIG. 10.

Figure 10:
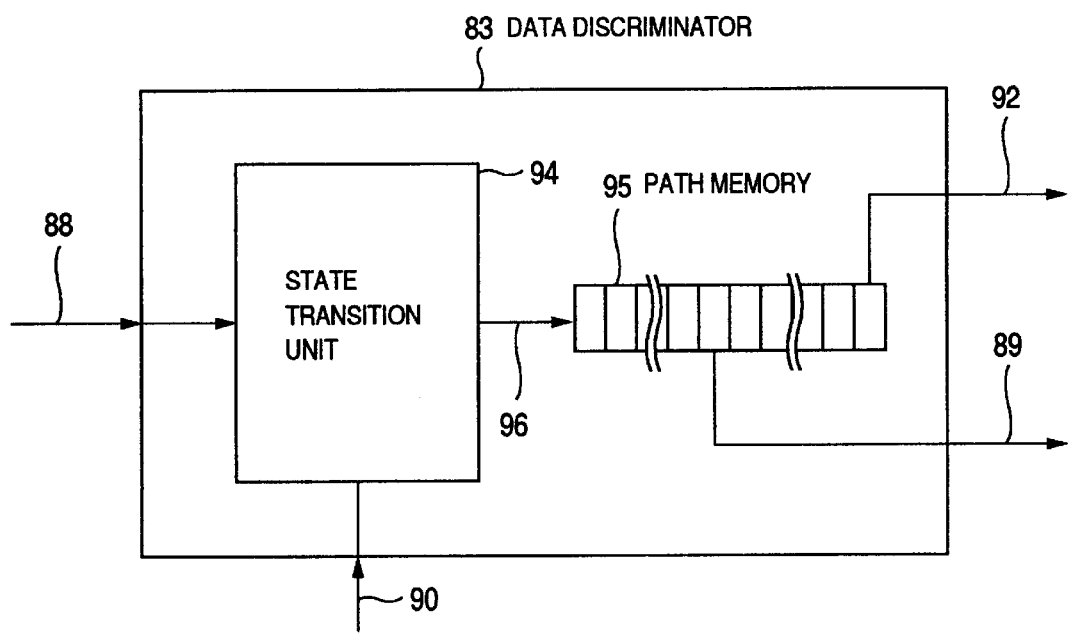
FIG. 10 is a diagram for explaining the configuration of the data discriminator according to the third embodiment.
Figure 11:
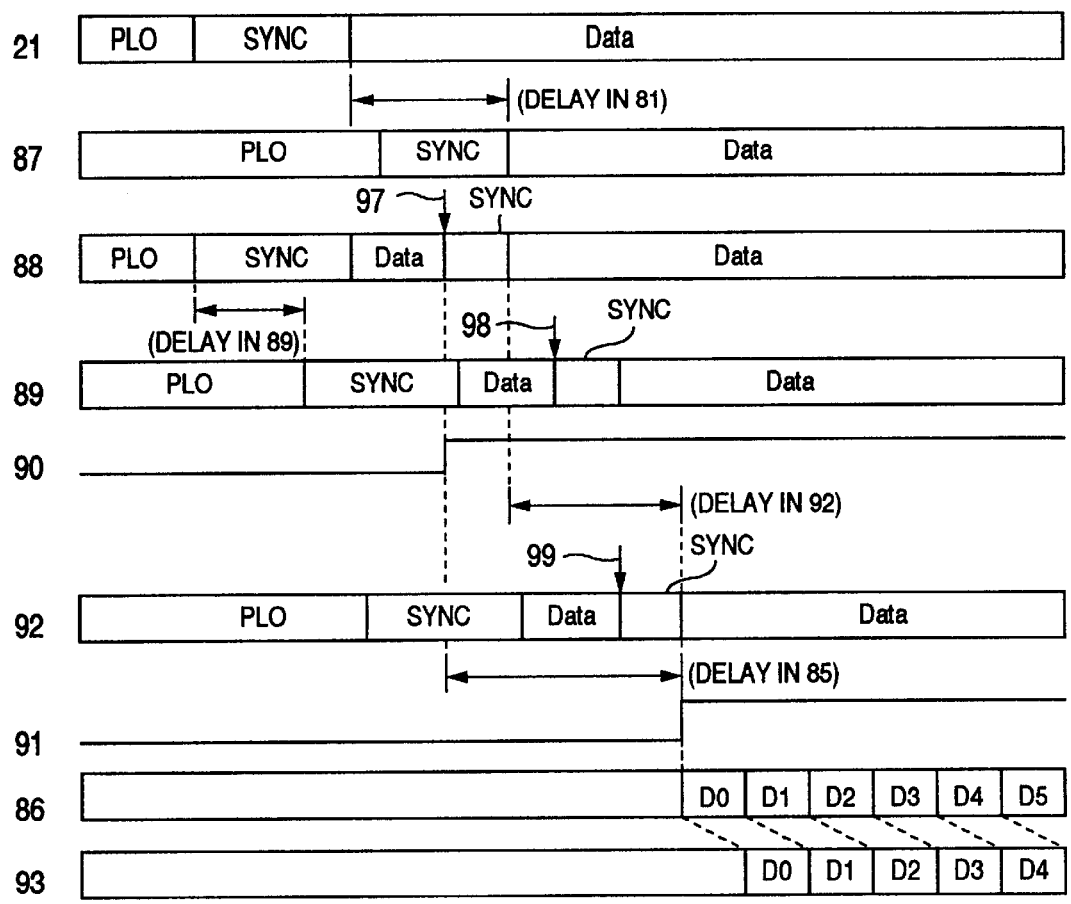
FIG. 11 is a diagram for explaining the signals at the various parts according to the third embodiment shown in FIG. 9.

As shown in FIG. 10, the data discriminator 83 includes a state transition unit 94 for realizing the state transition for discriminating the data and the data sync signal and a path memory 95 for establishing the information on the result of determination in the state transition unit 94. The input data select output 88 applied to the data discriminator 83 is applied to the state transition unit 94. The state transition unit 94 has the same configuration as the state transition unit 53 of the second embodiment, although the configuration of the state transition unit 94 changes according to the sync signal detection output 90. The select output 96 at the time of each state transition is applied to the path memory 95 where the discrimination data are sequentially established.

The data established in the path memory 95 are produced as a sync signal discrimination output 89 and a data discrimination output 92. The data establishment in the path memory 95 requires a considerable time depending on the coding scheme used. As described in the first embodiment, however, the delay before establishment of the discrimination data can be shortened than the delay for data discrimination at the time of discriminating the data sync signal. In view of this, as shown in FIG. 10, the path memory 95 can be so configured that the sync signal discrimination output 89 is pulled out midway of the path memory 95 to shorten the delay time. As another configuration, the path memory 95 may be configured into two parallel systems for sync signal discrimination output and data discrimination. Apparently, this configuration somewhat increases the circuit size but has an exactly equivalent function.

The third embodiment also uses the data format shown in FIG. 4 and has the same function as the second embodiment. FIG. 11, like FIG. 5, shows examples of signals produced at various parts in the configuration of the third embodiment of the invention shown in FIG. 9. The numerals in the left portion of the drawing coincide with the numbers of the signals produced at the various parts in FIG. 9, and the third embodiment operates on the time chart as shown in FIG. 11.

First, in the input data 21, "PLO" indicates a signal portion corresponding to a PLO sync section 76, "SYNC" a signal portion corresponding to a data sync signal 31, and "Data" a signal portion corresponding to a data section 78. Then comes an input data delay output 87 delayed by the delay circuit 81. This is followed by an input data select output 88 selected by the signal selector 82. The position where the signal is switched discontinuously by the sync signal detection output 90 regardless of the original reproduced signal is indicated by arrow 97. In the portion indicated by and subsequent to arrow 97, the signal corresponding to the data sync signal 31 midway and the data section 78 appear again.

Then, there is a sync signal discrimination output 89 delayed by an amount equal to the delay time of the data sync signal detection by the data discriminator 83. The position where the signal is switched discontinuously by the sync signal detection output 90 regardless of the original reproduced signal appears as indicated by arrow 98. Then comes the sync signal detection output 90. This output 90 rises at a position corresponding to the pattern collating section 32 of the first data sync signal 31 of the sync signal discrimination output 89, and thus indicates that the data sync signal could be detected. Then comes the data discrimination output 92. The output of the data discriminator 83 is divided into the sync signal discrimination output 89 and the data discrimination output 92, and therefore it is seen that the sync signal discrimination output 89 has a shorter delay time than the data discrimination output 92.

The position where the input signal is discontinuously switched in the data discrimination output 92 is located at a point indicated by arrow 99. Before and after this position, a structural discrimination error occurs. In view of the configuration in which the data is input again before a signal corresponding to the path convergence pattern section 33 of the data sync signal 31, however, the discrimination of the data section 78 is not affected. Then comes the sync signal delay output 91 making up the sync signal detection output 90 delayed in the delay circuit 85. At the rise point of this signal, the serial-to-parallel converter or the decoder 86 obtains an operation timing and starts operation. The manner in which the signal is processed internally of the serial-to-parallel converter or the decoder 86 and the synchronized output data 93 of the output of the serial-to-parallel converter or the decoder 86 are shown. According to this third embodiment, the delay time for sync signal discrimination and the delay time for data discrimination are optimized, thereby making it possible to shorten the delay of the synchronized output data 93 and produce an output at an early timing.

A fourth embodiment of the invention will be explained with reference to FIGS. 12 to 14. First, referring to FIG. 12, according to the fourth embodiment, the input data 21 is applied to a data discriminator 101. The data discriminator 101 produces a discriminated data discrimination output 111. This data discrimination output 111 is applied to a data sync signal detector 102, a first serial-to-parallel converter or a decoder 104 and a second serial-to-parallel converter or a decoder 105. The data sync signal detector 102 detects the data sync signal in the input data 21 and produces a sync signal detection output 112. The conventional method can be used directly for detecting the data sync signal in the data sync signal detector 102.

The sync signal detection output 112 is applied to the data discriminator 101, the delay circuit 103 and the first serial-to-parallel converter or the decoder 104. In the data discriminator 101, the configuration of the data discriminator is switched from that for data sync signal detection to that for data discrimination by the sync signal detection output 112. This is implemented by a configuration similar to the data discriminator 43 used in the second embodiment. As a result, like in the second embodiment, the same detection performance as the first embodiment can be obtained by the data discriminator 101. According to this embodiment, however, when the sync signal detection output 112 is output, the configuration of the data discriminator 101 is switched from that for sync signal detection to that for data discrimination midway of the data section.

When the sync signal detection output 112 is produced, the first serial-to-parallel converter or the decoder 104 starts operation at the particular timing. The delay circuit 103 delays the sync signal detection output 112 for a predetermined length of time and produces a sync signal delay output 114. The sync signal delay output 114 is applied to the second serial-to-parallel converter or the decoder 105 and another delay circuit 106. The second serial-to-parallel converter or the decoder 105 starts operation at the timing of the sync signal delay output 114 making up the sync signal detection output 112 delayed by a predetermined length of time.

The sync signal delay output 114 applied to another delay circuit 106 is further delayed and produced as a second sync signal delay output 116. This second sync signal delay output 116 is applied as a select signal of the signal selector 107. The signal selector 107 selects a first synchronized output data 113 produced from the first serial-to-parallel converter or the decoder 104 or a second synchronized output data 115 produced from the second serial-to-parallel converter or the decoder 105, and produces a synchronized output data 117.

The delay circuit 103 sets the operation timing of the second serial-to-parallel converter or the decoder 105, and the delay circuit 106 sets the timing of switching between the first synchronized output data 113 and the second synchronized output data 115 to produce the synchronized output data 117. Although the postcoding means is not described expressly, a postcode processing unit corresponding to the coding scheme used or the precoding process for recording is added to the interior or the output portion of the data discriminator 101.

Figure 13:
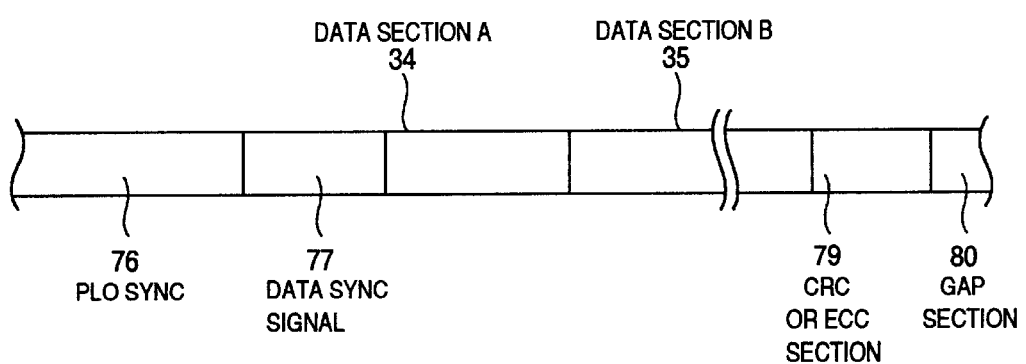
FIG. 13 is a diagram showing a data format according to the fourth embodiment.

According to the fourth embodiment, the data format shown in FIG. 13 is used. This format includes a PLO sync section 76, a data sync signal 77, a data section A 34, a data section B 35, a CRC or ECC 79 and a gap 80. The data section A 34 has, like the data sync signal 77, has a code limit of (d, k) where d is assumed to be "1" in the case under consideration. This code limit is different from the code limit for the data section B 35.

The data section is modulated with two types of code limit for the reason described below. Specifically, the data section A 34 is given the same function as the path convergence pattern section 33 attached to the data sync signal 31 in the first to third embodiments for establishing the pattern collating section thereby to eliminate the non-data portion like the path convergence pattern section 33. The data section A 34 has the same code limit as the data sync signal 77, and therefore the discrimination of the data sync signal 77 can be established by applying the signal of the data section A 34 following the data sync signal 77.

The data sync signal is detected to switch the configuration of the data discriminator 101 while the signal of the data section A 34 is being input. Immediately following the switching of the configuration of the data discriminator 101, the data section B 35 is applied to assure a continuous input signal waveform. Also, the signal of the data section A 34 is inserted in order to assure an error-free discrimination even after switching the configuration of the data discriminator 101 with the sync signal detection output 112. By doing so, the structural discrimination error is prevented unlike in the second and third embodiments.

Figure 12:
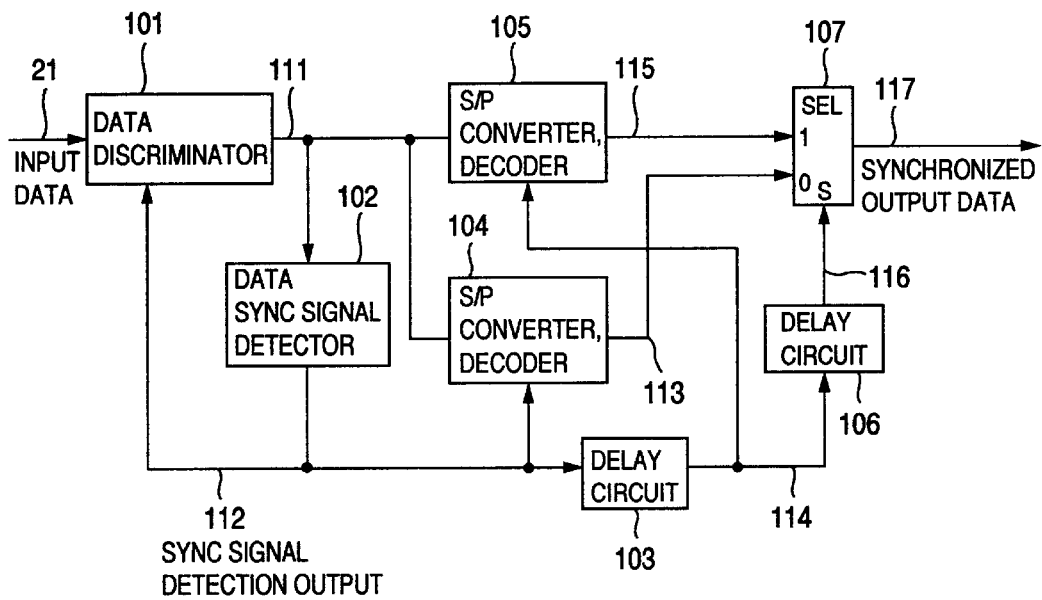
FIG. 12 is a diagram showing a configuration according to a fourth embodiment of the invention.
Figure 14:
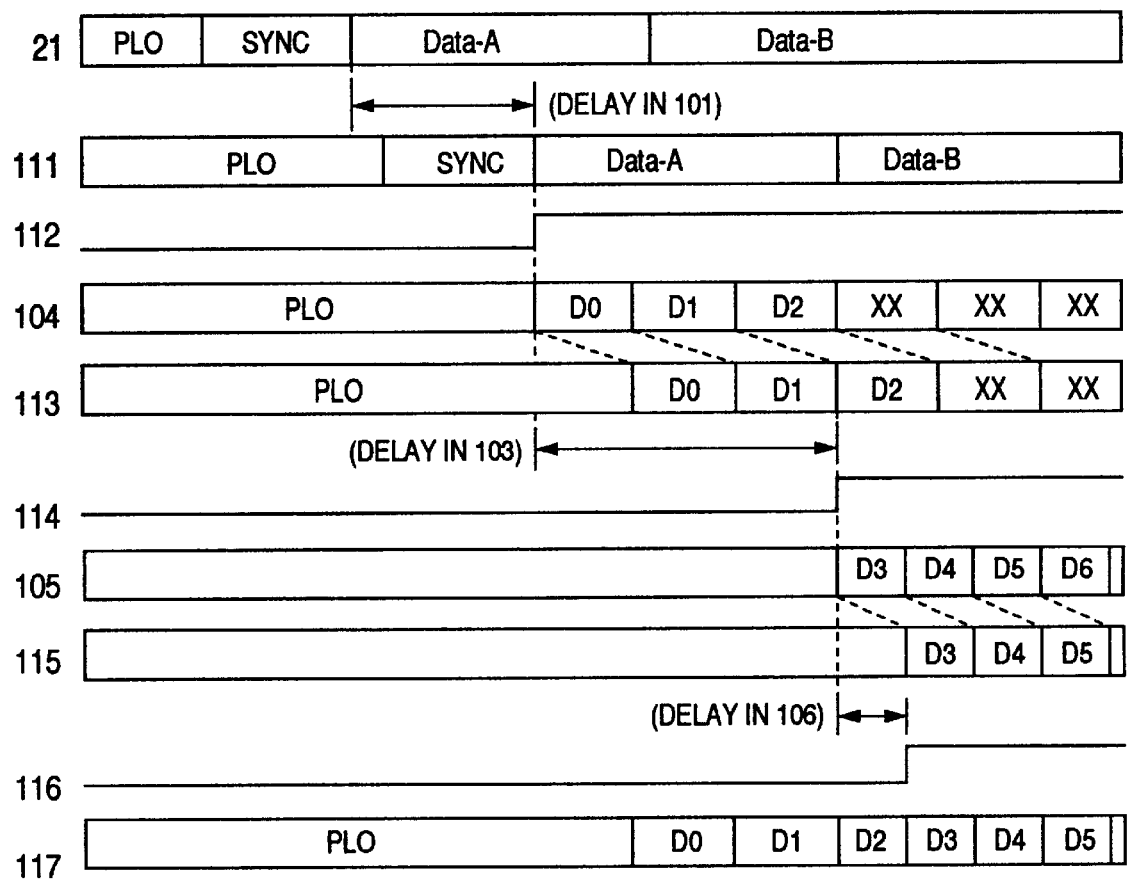
FIG. 14 is a diagram for explaining the signals at the various parts according to the fourth embodiment shown in FIG. 12.

FIG. 14, like FIG. 5, shows an example of signals produced at various parts of the configuration according to the fourth embodiment of the invention shown in FIG. 12. The numerals in the left portion of the drawing are coincident with the numbers of the various parts of FIG. 12, and the fourth embodiment operates on this time chart. First, there is an input data 21. In this data, "PLO" designates a signal portion corresponding to a PLO sync section 76, "SYNC" a signal portion corresponding to a data sync signal 77, "Data-A" a signal portion corresponding to a data section A 34, and "Data-B" a signal portion corresponding to a data section B 35. Then there is a discriminated data discrimination output 111 delayed by an amount equal to the delay of the data discriminator 101. This data is followed by the sync signal detection output 112. The signal rises by detecting the portion corresponding to the data sync signal 77 of the data discrimination output 111.

In the process, the input data 21 is the Data-A supplied with the signal corresponding to the data section A 34. The first serial-to-parallel converter or the decoder 104 also starts operating in synchronism with the sync signal detection output 112. Then there is the internal operation signal of the first serial-to-parallel converter or the decoder 104 and the first synchronized output data 113. This data is followed by the sync signal delay output 114 delayed by the delay circuit 103. The second serial-to-parallel converter or the decoder 105 operates in synchronism with this sync signal delay output 114. The internal operation signal of the second serial-to-parallel converter or the decoder 105 and the second synchronized output data 115 are shown as the next data.

The next data is another sync signal delay output 116 delayed in another delay circuit 106. This signal is used to switch the input of the signal selector 107 thereby to produce the synchronized output data 117, as shown. In this way, the detection of the data sync signal having the same detection ability as in the first to third embodiments can be implemented by changing the data modulation scheme without using the pass convergence pattern section 33.

Figure 15:
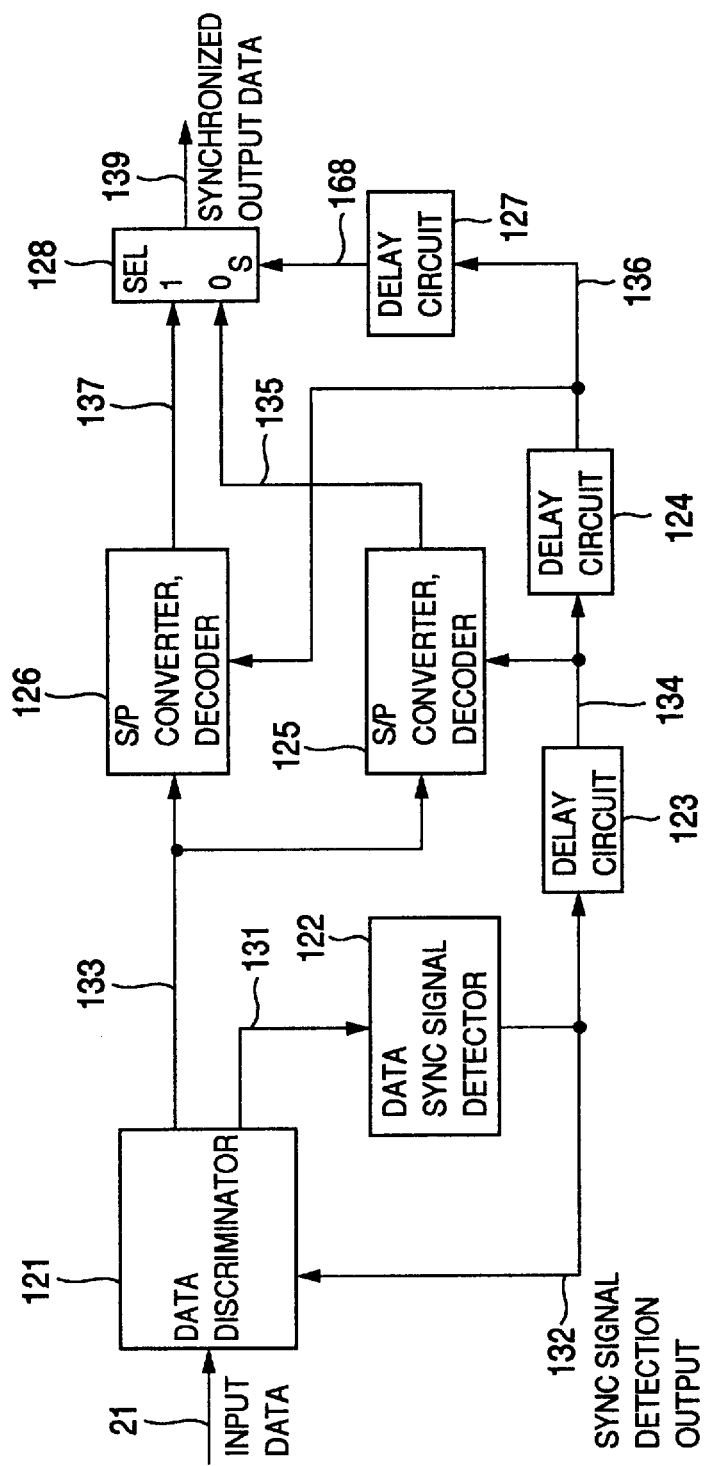
FIG. 15 is a diagram showing a configuration according to a fifth embodiment of the invention.

A fifth embodiment of the invention will be explained with reference to FIGS. 15 and 16. As shown in FIG. 15, according to this embodiment, the input data 21 is applied to a data discriminator 121. The data discriminator 121 discriminates the input data 21 and produces a sync signal discrimination output 131 and a data discrimination output 133. The sync signal discrimination output 131 is applied to a data sync signal detector 122. The data discrimination output 133 is applied to a first serial-to-parallel converter or a decoder 125 and a second serial-to-parallel converter or a decoder 126.

The data sync signal detector 122 detects the data sync signal in the input data 21 and produces a sync signal detection output 132. The same data sync signal detection method as in the prior art can be used for the data sync signal detector 122. The sync signal detection output 132 is applied to the data discriminator 121 and the first delay circuit 123.

The configuration of the data discriminator 121 is switched by the sync signal detection output 132 from that for data sync signal detection to that for data discrimination. This can be implemented with the same configuration as the data discriminator 83 used in the third embodiment. As a result, as in the third embodiment described above, the data discriminator 121 can achieve the same detection performance as in the first embodiment. In the case under consideration, however, like in the fourth embodiment, the configuration of the data discriminator 121 is switched midway of the data section when the sync signal detection output 132 is produced.

The first delay circuit 123 delays the sync signal detection output 132 by a predetermined length of time and produces a first sync signal delay output 134. The first sync signal delay output 134 is applied to a second delay circuit 124 and a first serial-to-parallel converter or a decoder 125. The first delay circuit 123, like the delay circuit 85 of the third embodiment, absorbs the difference in delay time between the sync signal discrimination output 131 and the data discrimination output 133 of the data discriminator 121. The first serial-to-parallel converter or the decoder 125 starts operation at the timing of the first sync signal delay output 134. The first serial-to-parallel converter or the decoder 125 processes a signal corresponding to the data section A 34 and produces a first synchronized data 135.

The second delay circuit 124 delays the first sync signal delay output 134 by a predetermined length of time and produces a second sync signal delay output 136. The second sync signal delay output 136 is applied to a second serial-to-parallel converter or a decoder 126 and a third delay circuit 127. The second serial-to-parallel converter or the decoder 126 starts operation at the timing of the second sync signal delay output 136. The second serial-to-parallel converter or the decoder 126 processes the signal corresponding to the data section B 35 and produces a second synchronized data 137. The second delay circuit 124 delays the first sync signal delay output 134 at the same timing as the signal corresponding to the data section B 35.

The second sync signal delay output 136 applied to the third delay circuit 127 is further delayed and produced as a third sync signal delay output 138. This third sync signal delay output 138 is applied as a select signal for the signal selector 128, which selects the first synchronized output data 135 constituting an output of the first serial-to-parallel converter or the decoder 125 or the second synchronized output data 137 constituting an output of the second serial-to-parallel converter or the decoder 126. The result selected by the signal selector 128 is produced as a synchronized output data 139. In the third delay circuit 127, the timing of switching the signal selector 128 is set at the head of the data section B 35.

Though not described expressly in this case, too, the postcoding processing unit corresponding to the coding scheme used or the precoding process for recording is added to the interior or the output portion of the data discriminator 121 as a postcoding means. According to the fifth embodiment, like in the fourth embodiment, the data format shown in FIG. 13 is used. The function of each signal is also similar to that in the fourth embodiment.

Figure 16:
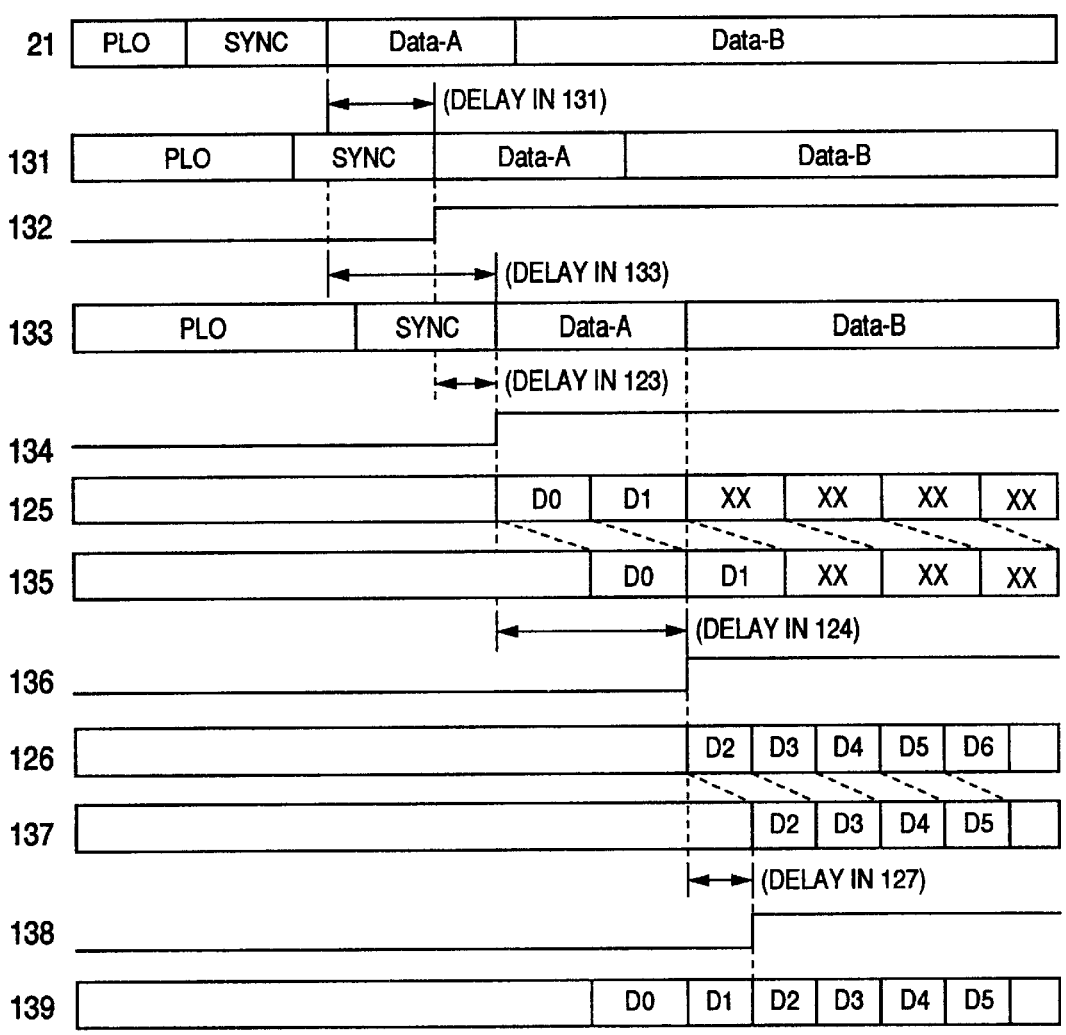
FIG. 16 is a diagram for explaining the signals at the various parts according to the fifth embodiment shown in FIG. 15.

FIG. 16, like FIG. 5, shows an example of signals produced at various parts in the configuration of the fifth embodiment shown in FIG. 15. The numerals in the left portion of FIG. 16 coincide with the numbers of the parts in FIG. 15. According to the fifth embodiment, the operation is performed on this time chart. First, the input data 21 is shown, in which "PLO" designates a signal portion corresponding to a PLO sync section 76, "SYNC" a signal portion corresponding to a data sync signal 77, "Data-A" a signal portion corresponding to a data section A 34 and "Data-B" a signal portion corresponding to a data section B 35. Then, there is a discriminated sync signal discrimination output 131 delayed by an amount equal to the delay in the data discriminator 121. Then there is a sync signal detection output 132. This output rises upon detection of a portion of the sync signal discrimination output 131 corresponding to the data sync signal 77. In the process, the input data 21 is "Data-A" and input as a signal corresponding to the data section A 34.

Then, there is a discriminated data discrimination output 133 delayed by an amount equal to the delay in the data discriminator 121. The delay amount of the sync signal discrimination output 131 is different from that of the data discrimination output 133. Then, there is a first sync signal delay output 134 delayed by the first delay circuit 123. The sync signal detection output 132 is delayed so that the signal rises at the head portion of the signal (Data-A) corresponding to the data section A 34 of the data discrimination output 133.

The first serial-to-parallel converter or the decoder 125 also starts operation in synchronism with the first sync signal delay output 134. Next, there are an internal operation signal of the first serial-to-parallel converter or the decoder 125 and the first synchronized output data 135. This is followed by the second sync signal delay output 136 delayed in the second delay circuit 124. The first sync signal delay output 134 is delayed, so that the signal rises at the head portion of the signal (Data-B) corresponding to the data section B 35 of the data discrimination output 133. The second serial-to-parallel converter or the decoder 126 starts operation in synchronism with the second sync signal delay output 136.

Next, there is an internal operation signal of the second serial-to-parallel converter or the decoder 126 and the second synchronized output data 137. Then, there is a third sync signal delay output 138 delayed in a third delay circuit 127. This signal is used to switch the input of the signal selector 128, and the synchronized output data 117 is produced in the manner shown.

As described above, according to the fifth embodiment, the output of the data discriminator 121 is divided into the sync signal discrimination output 131 and the data discrimination output 133, for each of which the delay time is optimized. In this way, the timing of the output of the synchronized output data 139 can be advanced as compared with the corresponding timing in the fourth embodiment, thereby reducing the delay time for data reproduction. Also in this fifth embodiment, like in the first embodiment, the data discriminator 121 may include the data discriminator 11 and the sync signal discriminator 12 separately from each other as a configuration for realizing a similar operation.

Figure 19:
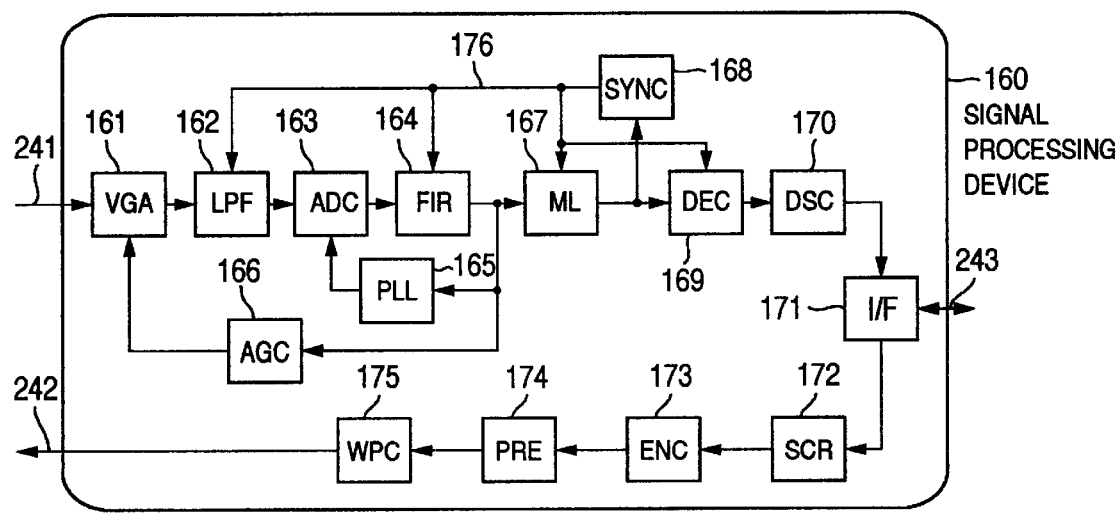
FIG. 19 is a diagram showing a signal processing device according to a sixth embodiment of the invention.

A signal processing device according to a sixth embodiment of the present invention will be explained with reference to FIGS. 19 to 21. The signal processing device 160 includes a form of a data sync signal detector according to the invention. As shown in FIG. 19, the signal processing device 160 specifically includes a variable gain amplifier 161 with the gain thereof capable of being changed, a low-pass filter 162 for limiting the band by removing the high-frequency component of the signal, an analog-to-digital converter 163 for converting an analog signal into a digital signal, an equalizer 164 for equalizing the signal to the desired characteristic, a clock detector 165 for extracting the clock information from the signal, an automatic gain controller 166 for generating a control signal for changing the gain of the variable gain amplifier 161 to secure a predetermined amplitude of the output of the equalizer 164, a data discriminator 167 for discriminating the data from the output of the equalizer 164, a data sync detector 168 for detecting the data sync signal, a decoder 169 for decoding the discrimination data, a descrambler 170 for restoring the scrambled data to the original state, a data input/output interface 171 for inputting/outputting the data to and from a host system, a scrambler 172 for scrambling the recording data, an encoder 173 for encoding the recording data, a precoder 174 for precoding the recording data in the desired manner, and a record correcting circuit 175 for correcting the recording data in a manner suitable for recording in the recording medium.

The reproducing operation is performed by this signal processing device 160 in the following manner. Specifically, the signal read out for reproduction is applied to the variable gain amplifier 161 as an input signal 241, and amplified (or attenuated) to a substantially constant amplitude under the control of the signal from the automatic gain controller 166. This signal is band-limited by the low-pass filter 162, converted from an analog signal to a digital signal by the analog-to-digital converter 163, and equalized to the desired characteristic by the equalizer 164. The output thus equalized is applied to the clock detector 165, the automatic gain controller 166 and the data discriminator 167. In the clock detector 165, the clock information is extracted from the equalized output signal input thereto thereby to generate a sampling clock for the analog-to-digital converter 163.

The automatic gain controller 166 generates a control signal from the equalized output signal input thereto for regulating the gain of the variable gain amplifier 161 to assure a constant output of the variable gain amplifier 161. Also, the data discriminator 167 discriminates data.

The configuration of the data sync signal detector according to the first to fifth embodiments described above or another configuration of the invention can be used as the configuration including the data discriminator 167, the data sync signal detector 168, and in some cases, the decoder 169 in the present embodiment. Specifically, as compared with the second embodiment of the invention shown in FIG. 6, the data discriminator 167 in the sixth embodiment corresponds to the component parts ranging from the delay circuit 41 to the data discriminator 43 in the second embodiment, the data sync detector 168 corresponds to the data sync signal detector 44 and the delay circuit 45 in the second embodiment, and the encoder 169 corresponds to the serial-to-parallel converter or the decoder 46 in the second embodiment.

Further, according to this embodiment, the sync signal detection output 176 produced from the data sync detector 168 is applied also to the low-pass filter 162 and the equalizer 164. As a result, like in the first to fifth embodiments described above, the characteristic of the low-pass filter 162 or the equalizer 164 can be changed by the sync signal detection output 176 to characteristics different before and after detection of the data sync signal. Thus, the detection ability of the data sync signal and the data can be improved by setting different optimum conditions for data sync signal detection and data discrimination, respectively.

From the data discriminated by the data discriminator 167, the data sync detector 168 detects the data sync signal, whereupon the decoder 169 decodes the signal. Further, the descrambler 170 descrambles the data into the original state, and the data thus descrambled is applied to the host system as reproduced data 243 from the data input/output interface 171.

The signal processing device 160 performs the recording operation as follows. Specifically, the information to be recorded in the recording medium is applied to the data input/output interface 171 from the host system as recording data 243, scrambled in the scrambler 172, encoded in the encoder 173, precoded as desired in the precoder 174, corrected for recording in the record correcting circuit 175, and output as a recording data 242. In the case where the configuration according to the fourth or fifth embodiment described above is used as a configuration including the data discriminator 167, the data sync detector 168 and the decoder 169, the encoder 173 requires two corresponding types of coding schemes. Also, although the precoder 174 for recording is shown expressly, the postcoder for reproduction is not shown. A corresponding postcoder is either incorporated in the data discriminator 167 or added to the output portion thereof.

Figure 20:
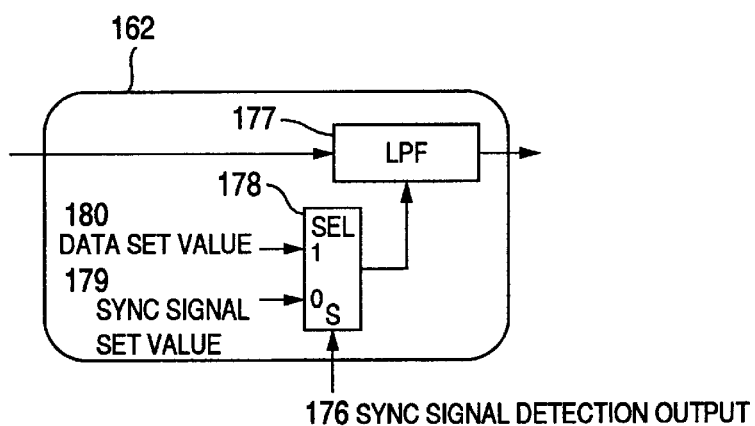
FIG. 20 is a diagram showing a configuration of a low-pass filter according to the sixth embodiment shown in FIG. 19.
Figure 21:
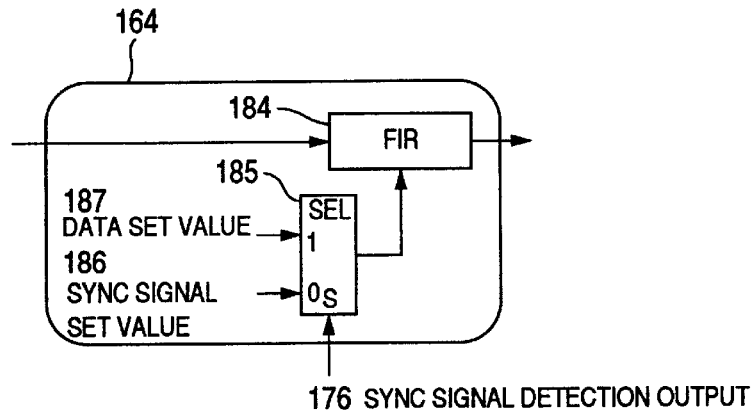
FIG. 21 is a diagram showing a configuration of the equalizer according to the sixth embodiment shown in FIG. 19.

FIG. 20 shows a configuration of the low-pass filter 162. A set value 179 for the sync signal and a set value 180 for the data constituting the characteristic setting parameters of the low-pass filter 162 are selected by the signal selector 178 according to the sync signal detection output 176 and set in the low-pass filter circuit 177. With this configuration, only one low-pass filter circuit will do. Further, FIG. 21 shows a configuration of the equalizer 164, in which a set value 186 for the sync signal and a set value 187 for the data constituting the characteristic setting parameters of the equalizer 184 are selected by the signal selector 185 according to the sync signal detection output 176 and set in the equalizer 184.

As another example of a configuration of the equalizer 164, the equalizer 164 may include two equalizing circuits, i.e. an equalizing circuit for the data sync signal and an equalizing circuit for the data, whose characteristics are determined by the set value for the sync signal and the set value for the data constituting the characteristic setting parameters thereof, respectively. In such a case, a signal selector supplied with the output signals from the two equalizing circuits is provided for selecting and producing a signal representing the result of equalization.

Figure 22:
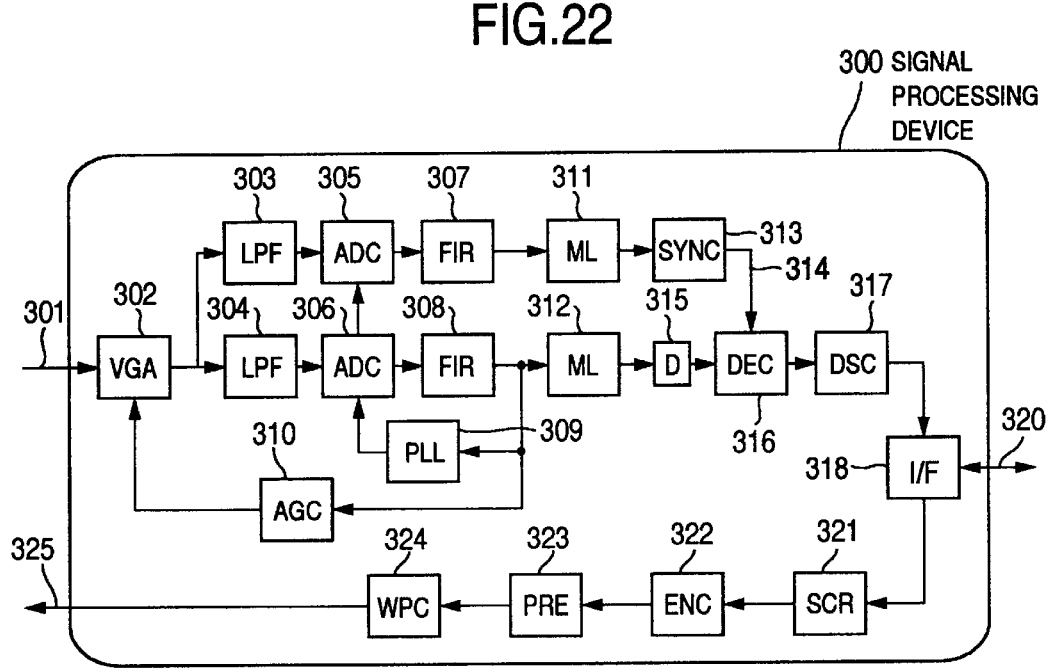
FIG. 22 is a diagram showing a signal processing device according to a seventh embodiment of the invention.

A signal processing device according to a seventh embodiment of the invention will be explained with reference to FIG. 22. A signal processing device 300 includes a different form of the data signal detector according to the invention. Thus, the signal processing device 300 comprises, as shown in FIG. 22, a variable gain amplifier 302 with the gain thereof capable of being changed, a low-pass filter 303 for removing the high-frequency component of the signal for the data sync signal and thus limiting the band, a low-pass filter 304 for removing the high-frequency component of the signal for the data and thus limiting the band, an analog-to-digital converter 305 for converting an analog signal for the data sync signal to a digital signal, an analog-to-digital converter 306 for converting an analog signal for data to a digital signal, an equalizer 307 for equalizing a signal for the data sync signal to the desired characteristic, an equalizer 308 for equalizing a signal for the data to the desired characteristic, a clock detector 309 for extracting the clock information from the signal, an automatic gain controller 310 for generating a control signal for changing the gain of the variable gain amplifier 302 to secure a constant amplitude of the output of the equalizer 308, a sync signal discriminator 311 for discriminating the data sync signal from the output of the equalizer 307, a data discriminator 312 for discriminating the data from the output of the equalizer 308, a data sync detector 313 for detecting the data sync signal, a delay circuit 315 for delaying the output of the data discriminator 312, a decoder 316 for decoding the output of the delay circuit 315, a descrambler 317 for restoring the scrambled data to the original state, a data input/output interface 318 for inputting/outputting the data to and from a host system, a scrambler 321 for scrambling the recording data, an encoder 322 for coding the recording data, a precoder 323 for precoding the recording data as desired, and a record correcting circuit 324 for correcting the recording data in a manner suitable for recording the data in a recording medium.

The signal processing device according to the seventh embodiment, unlike the sixth embodiment in which the data discrimination and the sync signal discrimination are performed in a single system, carries out the two discriminating operations separately from each other in two different systems, respectively, each through low-pass filter corresponding to the frequency characteristic of each signal.

The reproducing operation is performed by this signal processing device 300 in the following manner. Specifically, the signal read out for reproduction is applied to the variable gain amplifier 302 as an input signal 301, and amplified (or attenuated) to a substantially constant amplitude under the control of a signal of the automatic gain controller 310. The output signal of the variable gain amplifier 302 is applied to the low-pass filter 303 for the data sync signal and the low-pass filter 304 for the data. The output signal of the variable gain amplifier 302 is band-limited by the low-pass filter 303 for the data sync signal. The output of the low-pass filter 303 for the data sync signal is converted from an analog signal into a digital signal by the analog-to-digital converter 305 for the data sync signal, and equalized to the desired characteristic by the data sync signal equalizer 307.

The output of the data sync signal equalizer 307 is applied to the sync signal discriminator 311 for discriminating the data sync signal. The output of the sync signal discriminator 311 is applied to the data sync detector 313 for detecting the data sync signal. The sync signal detection output 314 thus detected is applied to the encoder 316 for giving a timing of coding. As a result of these operation, the characteristic for detecting the data sync signal can be adjusted to the data sync signal and the data sync signal detection ability can be improved.

For data reproduction, the output signal of the variable gain amplifier 302 is band-limited by the low-pass filter 304 for the data. The output of the low-pass filter 304 for the data is converted from an analog signal into a digital signal by the analog-to-digital converter 306 for the data and equalized to the desired characteristic by the data equalizer 308. The output of the data equalizer 308 is applied to the clock detector 309, the automatic gain controller 310 and the data discriminator 312. The clock detector 309 extracts the clock information from the equalized output signal input thereto, and generates a sampling clock for the analog-to-digital converters 305, 306. Also, in the automatic gain controller 310, a control signal for adjusting the gain of the variable gain amplifier 302 is generated from the equalized output signal input thereto to secure a constant output of the variable gain amplifier 302. The data discriminator 312 discriminates the data. As a result of this operation, the characteristics of these component parts are optimized for data discrimination thereby making it possible to configure a signal processing device for reproduction with a lower error rate.

The delay circuit 315 delays the output of the data discriminator 312. The output of the delay circuit 315 is applied to the decoder 316. The decoder 316 decodes the signal at the decode timing given by the sync signal detection output 314 detected. The output of the decoder 316 is descrambled in the descrambler 317, and produced through the data input/output interface 318 as a reproduction data 320.

The aforementioned configuration for signal reproduction makes it possible to optimize the characteristics for both data reproduction and data sync signal detection and to use the performances of these operation under the best conditions. Thus, the error rate of the data section can be reduced, and the detection rate of the data sync signal can be improved. Although this embodiment has such a configuration that the two low-pass filters are used in parallel for the data and the data sync signal, a single low-pass filter may be used with subsequent circuits configured in parallel as in the prior art.

The recording operation is performed by the signal processing device 300 in the following manner. The information to be recorded is applied to the data input/output interface 318 from the host system as a recording data 320, scrambled in the scrambler 321, encoded in the encoder 322, precoded in the precoder 323 as desired, corrected for the record operation in the record correcting circuit 324 and output as a recording data 325. In the case of using the same configuration as the fifth embodiment described above including the data discriminator 311, the data sync detector 313 and the decoder 316, two corresponding types of encoding schemes are required for the encoder 322. Also, the precoder 323 for recording is shown expressly, but not the postcoder for reproduction in the present embodiment. A corresponding postcoder is either included in each of the sync signal discriminator 311 and the data discriminator 312 or attached to the output unit thereof, respectively.

A signal processing device according to an eighth embodiment of the invention will be explained with reference to FIG. 26. A signal processing device 280 includes a form of the data signal detector according to the invention, with a new function added to the configuration of the sixth embodiment (FIG. 19).

Figure 26:
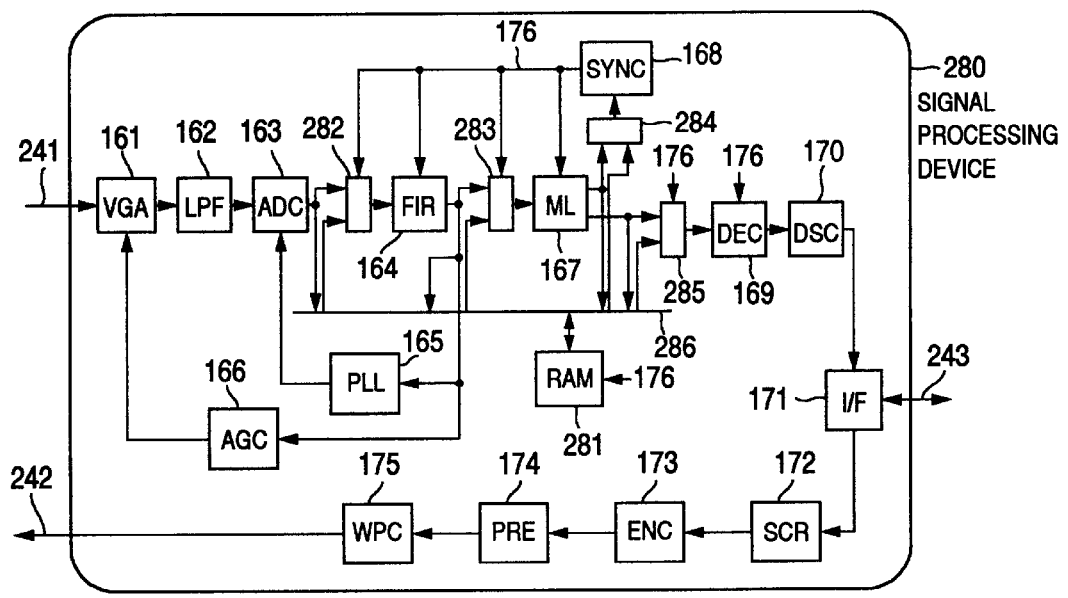
FIG. 26 is a diagram showing the configuration according to an eighth embodiment of the invention.

Thus, like the device shown in FIG. 19, the signal processing device 280 comprises, as shown in FIG. 26, a variable gain amplifier 161, a low-pass filter 162, an analog-to-digital converter 163, an equalizer 164, a clock detector 165 for extracting the clock information from the signal, an automatic gain controller 166 for generating a control signal for changing the gain of the variable gain amplifier 161 to secure a constant amplitude of the output of the equalizer 164, a data discriminator 167 for discriminating the data from the output of the equalizer 164, a data sync detector 168 for detecting the data sync signal, a decoder 169 for decoding the discrimination data, a descrambler 170 for restoring the scrambled data to the original state, a data input/output interface 171 for inputting/outputting the data to and from a host system, a scrambler 172 for scrambling the recording data, an encoder 173 for encoding the recording data, a precoder 174 for precoding the recording data as desired, and a record correcting circuit 174 for correcting the recording data in a manner suitable for recording in a recording medium, a storage unit 281 (used as a retrial memory) for storing the information, a signal selector 282 for switching between the output of the analog-to-digital converter 163 and the output of the storage unit 281, a signal selector 283 for switching between the output of the equalizer 164 and the output of the storage unit 281, a signal selector 284 for switching between the output of the data discriminator 167 and the output of the storage unit 281, a signal selector 285 for switching between the other output of the data discriminator 167 and the output of the storage unit 281, and a data bus 286 for facilitating the signal transfer between the storage unit 281, the signal selector 282 and the signal selector 285.

The reproducing operation of the signal processing device 160 is described below. The operation shared by the sixth embodiment shown in FIG. 19, however, will not be described but only the part of the operation constituting the feature of the present embodiment will be explained. Also, several methods of implementing the reproducing operation are conceivable and some of them will be explained specifically.

In the first method, the output of the equalizer 164 is stored in the storage unit 281 through the data bus 286. The same information is input to the data discriminator 167 through the signal selector 283, and after data discrimination, the output of the data discriminator 167 is input to the data sync detector 168 through the signal selector 284 for detecting the data sync signal. The information stored in the storage unit 281 is produced by the sync signal detection output 176 thus detected, while at the same time switching the input signal of the signal selector 283, so that the information from the storage unit 281 is input to the data discriminator 167. In the process, the characteristic of the data discriminator 167 is switched or the result of the discrimination of a different characteristic is output by the sync signal detection output 176. The resulting signal is input to the decoder 169 through the signal selector 285 and, after the decoding operation, an output signal 243 is produced through the data input/output interface 171.

In the second method, the output of the analog-to-digital converter 163 is stored in the storage unit 281 through the data bus 286. The same information is applied to the equalizer 164 through the signal selector 282 and further input to the data discriminator 167 through the signal selector 283. After data discrimination in the data discriminator 167, the output thereof is applied to the data sync detector 168 through the signal selector 284 for carrying out the data sync signal detection. The information stored in the storage unit 281 is output by the sync signal detection output 176 thus detected, while at the same time switching the input signal of the signal selector 282 so that the information from the storage unit 281 is input to the equalizer 164. In the process, by switching the characteristic of the equalizer 164 according to the sync signal detection output 176, the data discrimination with the equalization suited to the data characteristic is made possible. The characteristic of the data discriminator 167 can of course be changed at the same time.

On the other hand, consider the case in which the first detection of the data sync signal fails and a retrial requiring the repeated reproduction occurs. In such a case, in view of the fact that the sync signal detection output 176 is not produced, the characteristic of the equalizer 164 is changed by the controller not shown of the signal processing device 280. Thus, the information first stored is output from the storage unit 281 (retrial memory), input through the signal selector 282 to the equalizer 164 for performing a different equalization from the preceding one. The data thus equalized is further input to the data discriminator 167 through the signal selector 283 for data discrimination, after which the output is applied to the data sync detector 168 through the signal selector 284 thereby to carry out the data sync signal detection.

In this way, the equalization different from the preceding one probably makes possible correct discrimination and the availability of output from the storage unit 281 shortens the delay time for the reproduction process. The data sync signal is detected, and the information stored in the storage unit 281 is produced by the sync signal detection output 176. At the same time, the information from the storage unit 281 is input again to the equalizer 164 through the signal selector 282, and the characteristic of the equalizer 164 is switched by the sync signal detection output 176. Thus, the data discrimination with the equalization suited to the data characteristic is made possible. In this case, too, the characteristic of the data discriminator 167 can be changed at the same time.

In the third method, the data discriminator 167 is so configured that a data discriminator and a data sync signal discriminator are arranged in parallel internally as in the first embodiment. Further, at the time of the first data sync detection according to the second method described above, the output of the data discriminator 167 is also input to and stored in the storage unit 281 as information. This is made possible by using the data bus 286 by time division. If required, a data buffer is inserted in the corresponding signal line.

In case of a failure of the first data sync signal, the second detection for a retrial is also carried out in the same manner as in the second method described above. In case of a failure of this detection, the threshold value of the data discriminator and the filter characteristic are required to be changed. In the case where the detection of the data sync signal is successful and the sync signal detection output 176 is produced, on the other hand, the information of the data discriminator 167 stored previously is output from the storage unit 281. This output is applied through the signal selector 285 to the decoder 169 for decoding, after which a decoded output is produced as an output signal 243 through the data input/output interface 171. By doing so, the information stored can be decreased by limiting the portion for storing the output of the analog-to-digital converter 163 having many bits, while at the same time shortening the delay time for the reproduction process.

Various other methods are available. For example, the outputs of the analog-to-digital converter 163, the equalizer 164 and the data discriminator 167 are stored in the storage unit 281, and the signal adapted for a given method of using them can be output from the storage unit 281. A configuration including a storage unit and a signal selector based on the configuration of the seventh embodiment is also possible.

The recording operation of the signal processing device 280 is similar to that of the sixth embodiment shown in FIG. 19 and therefore will not be described again. In the case where the configuration including the data discriminator 167, the data sync detector 168 and the decoder 169 according to the fourth or fifth embodiment described above is used, two corresponding types of encoding schemes are required for the encoder 173. Further, the data format disclosed in JP-A-10-255400 and U.S. Pat. No. 5,844,920 is applicable. An example of application of the invention to the formats for recording and reproduction in and from these recording media is shown in FIGS. 24A to 24E.

Figure 24A:
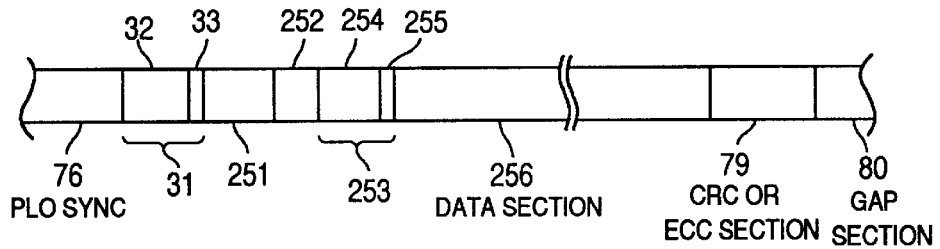
FIGS. 24A to 24E are diagrams showing other data formats according to the invention.

FIG. 24A shows the case in which the data sync signal is arranged at two points. The data format includes a PLO sync 76, a data sync signal 31 having a pattern collating section 32 and a path convergence pattern section 33, a first data section 251, a second PLO sync 252, a second sync signal 253 having a second pattern collating section 254 and a second path convergence pattern section 255, a second data section 256, a CRC or ECC 79, and a gap 80. The two data sync signals each include a corresponding path convergence pattern section.

Figure 24B:
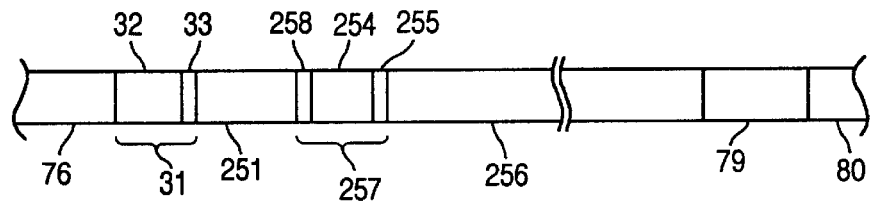

FIG. 24B shows the case in which the second PLO sync 252 is not included in the example of FIG. 24A. The data format includes a PLO sync 76, a data sync signal 31 having a pattern collating section 32 and a path convergence pattern section 33, a first data section 251, a second sync signal 257 having a third convergence pattern collating section 258 and a second path convergence pattern section 255 before and after the second pattern collating section 254, respectively, a second data section 256, a CRC or ECC 79, and a gap 80. The second data sync signal 257 requires a third path convergence pattern section 258 for converging the path in the first data section 251 also before the second pattern collating section 254.

Figure 24C:
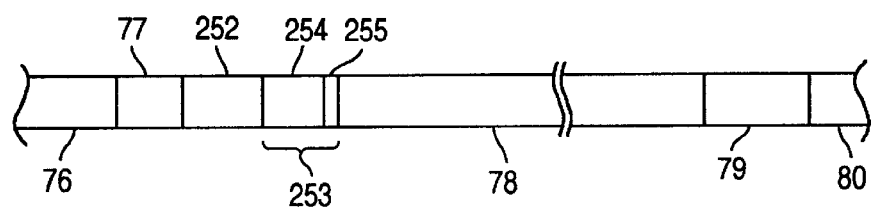
Figure 27:
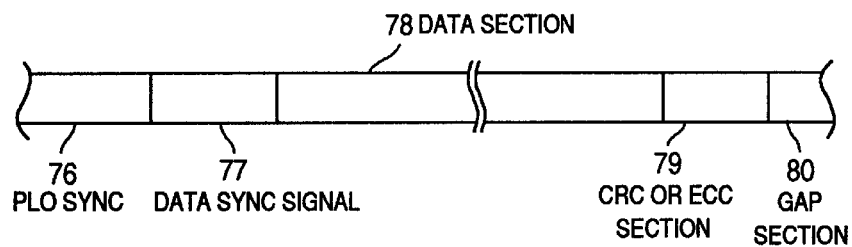
FIG. 27 is a diagram showing the conventional data format.

FIG. 24C shows the case in which the first data section 251 is not included in the example of FIG. 27A. The data format includes a PLO sync 76, a data sync signal 77 (the conventional one having no path convergence pattern section can be used), a second PLO sync 252, a second data sync signal 253 having a second pattern collating section 254 and a second path convergence pattern section 255, a data section 78, a CRC or ECC 79 and a gap 80. Only the second data sync signal 253 requires the path convergence pattern section 255.

Figure 24D:
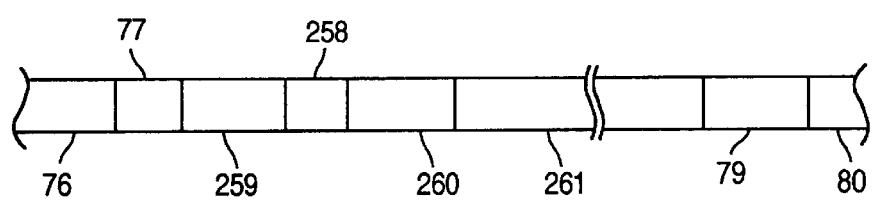

FIG. 24D shows the case in which the data is recorded by two types of coding schemes. The data format includes a PLO sync 76, a data sync signal 77, a data section 259 with the first data encoded by the first encoding scheme, a second data sync signal 258, a data section 260 with the second data encoded by the first encoding scheme, a data section 261 with the third data encoded by the second encoding scheme, a CRC or ECC 79 and a gap 80. The use of two types of coding schemes eliminates the need of the path convergence pattern section. Also, the data section 259 and the data sync signal 258 may include a second PLO sync 252. Further, the data section 259 may be replaced by the second PLO sync 252.

Figure 24E:
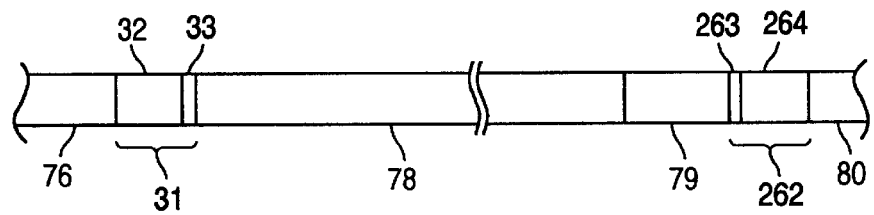

FIG. 24E shows the case in which the data sync signal is arranged at two points, one of which is after the CRC or ECC 79. The data format includes a PLO sync 76, a data sync signal 31 having a pattern collating section 32 and a path convergence pattern section 33, a data section 78, a CRC or ECC 79, a second data sync signal 262 having a second pattern collating section 264 and a second path convergence pattern section 263, and a gap 80. Assume that the data of the same pattern as the PLO sync is written in the gap 80. By doing so, the second data sync signal 262 can discriminate the data either from the CRC or ECC 79 side or from the gap 80 side. Other formats than the one described above are possible. For example, component elements described above may be combined or the number of places where the data sync signal is arranged may be further increased.

Figure 23:
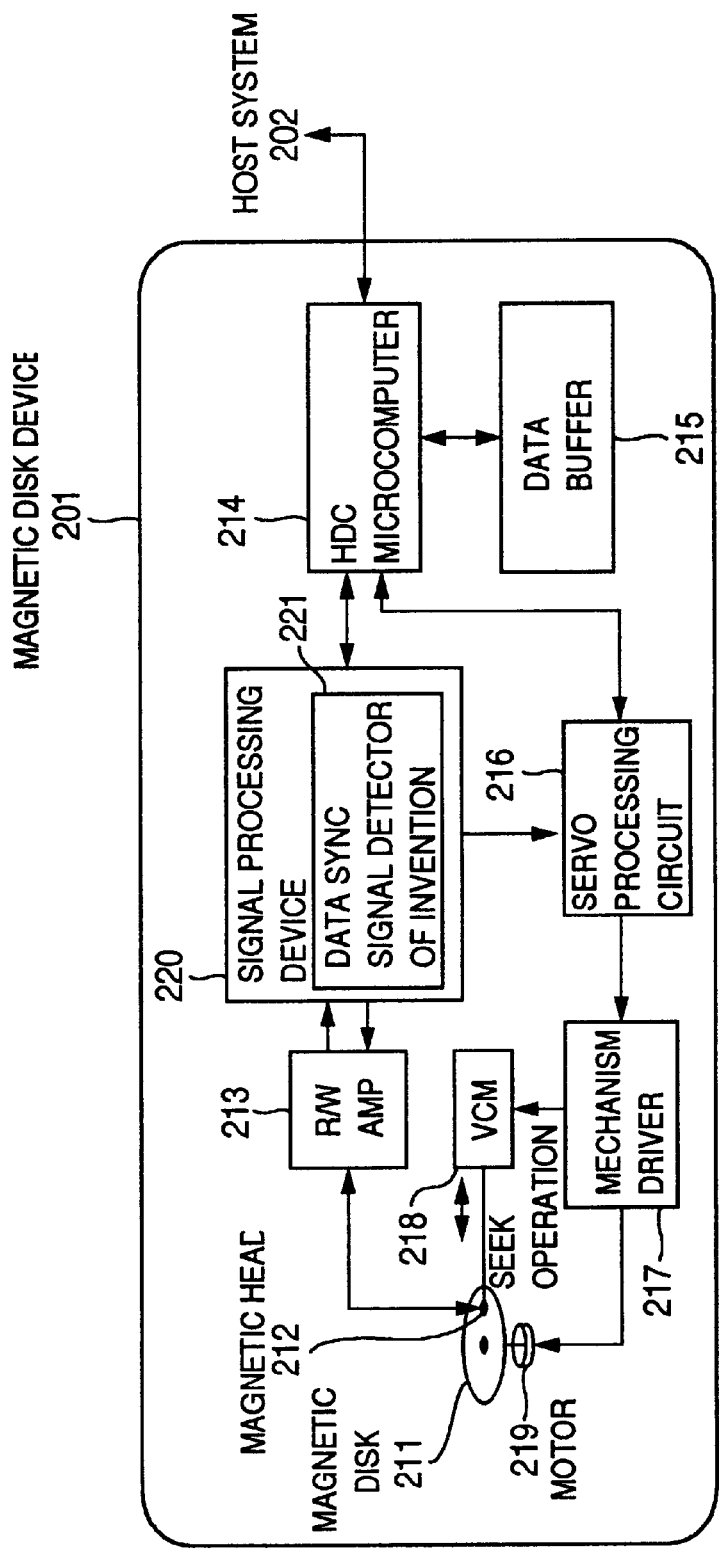
FIG. 23 is a diagram showing an example of the magnetic disk unit according to the invention.

FIG. 23 shows an example of a magnetic disk device using the data sync signal detector according to the invention. A magnetic disk device 201 includes a magnetic disk 211, a magnetic head 212, a read/write amplifier 213, a HDC (hard disk controlled) microcomputer 214, a data buffer 215, a servo processing circuit 216, a mechanism driver 217, a VCM 218, a motor 219 and a signal processing device 220.

The signal processing device 220 includes a signal processing device according to the sixth or seventh embodiment described above having another configuration according to the invention or a data sync signal detector 221 having another configuration according to the first or fifth embodiment of the invention described above. The magnetic disk device 201 having this configuration can be realized with a small detection error of the data sync signal.

The present invention has been specifically described above with reference to embodiments. The invention, however, is not confined to those embodiments, but can of course be variously modified without departing from the spirit and scope of the invention. For example, in addition to the data sync signal detector according to the invention having a magnetic disk device illustrated above, the invention is also applicable with effect to a signal processing circuit, an integrated circuit, a magneto-optic disk device, an optical disk device or a floppy disk device for information processing. Also, the functions of the various configurations described above as hardware can alternatively be implemented as software with a computer program.

What is claimed is:

1. A data sync signal detector comprising:
   data discrimination means configured to receive input data including a data sync signal for data synchronization and a data signal following said data sync signal, said discrimination means discriminating said data signal from said input data;
   sync signal discrimination means supplied with said input data for discriminating said data sync signal from said input data; and
   data sync signal detection means for detecting the data sync signal from a discrimination bit string output from said sync signal discrimination means,
   wherein said data sync signal includes:
      a pattern collating section for collating the discrimination bit string for data sync detection; and
      a path convergence pattern section following said pattern collating section for converging the result of discrimination of the data sync signal by said sync signal discrimination means;
   wherein said data sync signal is configured of a pattern of which the number of continuous inversions of the recording information on the recording medium for recording said data sync signal is limited to not more than m (m=0, 1, 2 or 3), and
   wherein said data signal is configured of a pattern of which the number of continuous inversions of the recording information on the recording medium for recording said data signal is limited to not more than n, m being smaller than n.

2. A data sync signal detector comprising:
   discrimination means configured to receive input data for discriminating said input data including a data sync signal for data synchronization and a data signal following said data sync signal; and
   data sync signal detection means for detecting the data sync signal from a discrimination bit string output from said discrimination means;
   wherein said discrimination means switches the discrimination characteristic by the sync signal detection output produced from said data sync signal detection means,
   wherein said data sync signal includes:
      a pattern collating section for collating the discrimination bit string for data sync detection; and
      a path convergence pattern section following said pattern collating section for converging the result of discrimination of the data sync signal by said discrimination means;
   wherein said data sync signal is configured of a pattern of which the number of continuous inversions of the recording information on the recording medium for recording said data sync signal is limited to not more than m (m=0, 1, 2 or 3), and
   wherein said data signal is configured of a pattern of which the number of continuous inversions of the recording information on the recording medium for recording said data signal is limited to not more than n, m being smaller than n.

3. A data sync signal detector according to claim 2, further comprising:
   delay means supplied with said input data for producing the delay input data delayed by a predetermined length of time; and
   select means supplied with said input data and said delay input data for selecting said input data or said delay input data and outputting selected one of said input data and said delay input data to said discrimination means;
   wherein said select means selects said input data or said delay input data by said sync signal detection output.

4. A data sync signal detector comprising:
   discrimination means configured to receive nput data for discriminating said input data including a data sync signal for data synchronization and a data signal following said data sync signal;
   data sync signal detection means for detecting the data sync signal by the discrimination bit string output from said discrimination means;
   first decoding means for decoding the data encoded according to a first encoding scheme from the discrimination bit string output from said discrimination means; and
   second decoding means for decoding the data encoded according to a second encoding scheme from the discrimination bit siring output from said discrimination means;
   wherein the discrimination characteristic of said discrimination means is switched by the sync signal detection output produced from said data sync signal detection means;

wherein said first decoding means and said second decoding means are so configured as to obtain the decode timing from said sync signal detection output;

wherein one of the output of said first decoding means end the output of said second decoding means is selected by said sync signal detection output;

wherein said data sync signal and the data signal following said data sync signal and encoded by said first decoding scheme are each configured of a pattern of which the number of continuous inversions of the recording information on the recording medium for recording said signals is limited to not more than m(m=0, 1, 2 or 3), and wherein said data signal encoded by said second encoding scheme is configured of a pattern of which the number of continuous inversions of the recording information on the recording medium for recording said data signal is limited to not more than n, m being smaller than n.

5. A signal processing device comprising:

low-pass filter means for giving a low-pass characteristic to an input analog signal;

analog-to-digital conversion means for converting the analog signal output from said low-pass filter means to a digital signal;

equalizing means for equalizing the output of said analog-to-digital conversion means;

discrimination means including a Viterbi decoder configured to receive an output signal of said equalizing means for data discrimination; and data sync signal detection means for detecting the data sync signal by the discrimination bit string output from said discrimination means;

wherein said output of said data sync signal detection means is received by said low-pass filter means such that the characteristic of selected one of said low-pass filter means, said equalizing means and said discrimination means is switched by the sync signal detection output.

6. An information recording and reproducing apparatus comprising:

the signal processing device described in claim 5;

an information recording medium for recording the information; and recording and reproducing means for recording or reproducing the information into or from said information recording medium.

7. A signal processing device comprising:

low-pass filter means for giving a low-pass characteristic to an input analog signal;

analog-to-digital conversion means for converting the analog signal output from said low-pass filter means to a digital signal;

equalizing means for equalizing the output of said analog-to-digital conversion means;

discrimination means including a Viterbi decoder configured to receive an output signal of said equalizing means for performing data discrimination;

data sync signal detection means for detecting the data sync signal from the discrimination bit string output from said discrimination means;

code processing means for performing serial-to-parallel conversion or decoding of the discrimination bit string output from said discrimination means; and information storage means capable of storing the bit information temporarily;

wherein said information storage means is supplied with, storing and outputting the information including at least selected one of the output of said analog-to-digital conversion means, the output of said equalizing means and the output of said discrimination means;

wherein the information output from said information storage means is applied to at least selected one of the input of said equalizing means, the input said discrimination means, the input of said data sync signal detection means and the input of said code processing means; and wherein the characteristics of selected one of said equalizing means and said discrimination means are switched when information is input to said information storage means and when information is output from said information storage means.

8. An information recording and reproducing apparatus comprising:

the signal processing device described in claim 7;

an information recording medium for recording the information; and recording and reproducing means for recording or reproducing the information into or from said information recording medium.

* * * * *